US011216953B2

(12) United States Patent
Lim

(10) Patent No.: US 11,216,953 B2
(45) Date of Patent: Jan. 4, 2022

(54) APPARATUS AND METHOD FOR IMAGE REGION DETECTION OF OBJECT BASED ON SEED REGIONS AND REGION GROWING

(71) Applicant: SAMSUNG ELECTRONICS CO., LTD., Suwon-si (KR)

(72) Inventor: Hyungjun Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 101 days.

(21) Appl. No.: 16/563,257

(22) Filed: Sep. 6, 2019

(65) Prior Publication Data

US 2020/0311945 A1 Oct. 1, 2020

(30) Foreign Application Priority Data

Mar. 26, 2019 (KR) .................. 10-2019-0034640
Jun. 28, 2019 (KR) .................. 10-2019-0078215

(51) Int. Cl.
*G06T 7/187* (2017.01)
*G06T 7/90* (2017.01)
*G06T 7/11* (2017.01)

(52) U.S. Cl.
CPC .............. *G06T 7/187* (2017.01); *G06T 7/11* (2017.01); *G06T 7/90* (2017.01); *G06T 2207/20021* (2013.01); *G06T 2207/20084* (2013.01); *G06T 2207/20156* (2013.01)

(58) Field of Classification Search
CPC ... G06T 7/187; G06T 7/11; G06T 7/90; G06T 2207/20084; G06T 2207/20156; G06T 2207/20021; G06K 9/4652
See application file for complete search history.

(56) References Cited

U.S. PATENT DOCUMENTS

| 8,571,353 B2 | 10/2013 | Watanabe |
| 8,660,350 B2 | 2/2014 | Seo |
| 2002/0164074 A1* | 11/2002 | Matsugu ............... G06T 7/174 382/173 |

(Continued)

FOREIGN PATENT DOCUMENTS

| JP | 2007-504746 A | 3/2007 |
| JP | 4801164 B2 | 10/2011 |

(Continued)

OTHER PUBLICATIONS

Communication dated Jun. 30, 2020, issued by the Korean Intellectual Property Office in Korean Application No. 10-2019-0078215.

(Continued)

*Primary Examiner* — Casey L Kretzer
(74) *Attorney, Agent, or Firm* — Sughrue Mion, PLLC

(57) ABSTRACT

An image processing apparatus includes a memory configured to store first region detection information corresponding to at least one object of a first frame, and a processor configured to perform region growing processing based on a seed region identified from a second frame and the first region detection information, obtain second region detection information corresponding to at least one object of the second frame, and perform image processing on the second frame based on the second region detection information.

20 Claims, 27 Drawing Sheets

(56) References Cited

U.S. PATENT DOCUMENTS

| | | | |
|---|---|---|---|
| 2004/0130546 A1 | 7/2004 | Porikli | |
| 2007/0076957 A1 | 4/2007 | Wang et al. | |
| 2008/0025390 A1 | 1/2008 | Shi et al. | |
| 2012/0201460 A1 | 8/2012 | Seo | |
| 2013/0266223 A1* | 10/2013 | Zhang | G06T 7/187 |
| | | | 382/173 |
| 2014/0192205 A1 | 7/2014 | Bahadirov | |
| 2015/0146915 A1 | 5/2015 | Peng et al. | |
| 2017/0169574 A1* | 6/2017 | Xie | G06T 7/254 |
| 2018/0364800 A1 | 12/2018 | Na et al. | |

FOREIGN PATENT DOCUMENTS

| | | |
|---|---|---|
| KR | 10-2007-0056229 A | 6/2007 |
| KR | 10-2010-0118162 A | 11/2010 |
| KR | 10-1018299 B1 | 3/2011 |
| KR | 10-1223046 B1 | 1/2013 |
| KR | 10-2014-0090078 A | 7/2014 |
| KR | 10-1560830 B1 | 10/2015 |
| KR | 10-2016-0037643 A | 4/2016 |
| KR | 10-2017-0006840 A | 1/2017 |
| WO | 2005/025231 A1 | 3/2005 |
| WO | 2017/156628 A1 | 9/2017 |

OTHER PUBLICATIONS

International Search Report (PCT/ISA/210) dated Feb. 14, 2020 issued by the International Searching Authority in International Application No. PCT/KR2019/013957.

Written Opinion (PCT/ISA/237) dated Feb. 14, 2020 issued by the International Searching Authority in International Application No. PCT/KR2019/013957.

Redmon et al., "YOLOv3: An Incremental Improvement", Apr. 8, 2018, 6 pages total.

* cited by examiner 4-connectivity      8-connectivity 6-connectivity      6-connectivity
NW/SE            NW/SE

FIG. 7A

| 0 | 0 | 0 | 0 | 0 | 0 | 0 |
|---|---|---|---|---|---|---|
| 0 | 1 | 1 | 0 | 1 | 1 | 0 |
| 0 | 1 | 1 | 1 | 1 | 1 | 0 |
| 0 | 0 | 1 | 1 | 1 | 0 | 0 |
| 0 | 0 | 0 | 1 | 0 | 0 | 0 |
| 0 | 0 | 0 | 0 | 0 | 0 | 0 |

FIG. 7B

| 10 | 20  | 20  | 20  | 20  | 20  | 10 |
|----|-----|-----|-----|-----|-----|----|
| 10 | 220 | 220 | 10  | 220 | 220 | 10 |
| 10 | 230 | 240 | 245 | 240 | 230 | 10 |
| 20 | 10  | 238 | 250 | 238 | 10  | 20 |
| 20 | 20  | 10  | 240 | 10  | 20  | 20 |
| 20 | 20  | 10  | 10  | 10  | 20  | 20 |

FIG. 7C

| | |
|---|---|
| (2,2) | (3,2) |
| (5,2) | (6,2) |
| (2,3) | (3,3) |
| (4,3) | (5,3) |
| (6,3) | (3,4) |
| (4,4) | (5,4) |
| (4,5) | |

APPARATUS AND METHOD FOR IMAGE REGION DETECTION OF OBJECT BASED ON SEED REGIONS AND REGION GROWING

CROSS-REFERENCE TO RELATED APPLICATIONS

This application claims priority from Korean Patent Application No. 10-2019-0034640, filed on Mar. 26, 2019, in the Korean Intellectual Property Office, and Korean Patent Application No. 10-2019-0078215, filed on Jun. 28, 2019, in in the Korean Intellectual Property Office, the disclosures of which are herein incorporated by reference in their entireties.

BACKGROUND

1. Field

Devices and methods consistent with what is disclosed herein relate to an image processing apparatus and an image processing method, and more particularly, to an image processing apparatus for performing region detection for image processing and an image processing method thereof.

2. Description of the Related Art

With the development of electronic technology, various types of electronic apparatuses have been developed and widely used. Particularly, a display apparatus used in a variety of places such as home, office, and public place has been developed for years.

Recently, there is an increasing demand for a high-resolution image service, and a real-time streaming service.

In order to provide a high-resolution image service, various image processing could be performed on an input image. In this case, if an entire image is divided into object or meaningful regions, and image processing is performed, it could increase image quality.

According to a conventional region detection method, an image growing is performed through a number of iterations after a separated seed region is detected from each image frame. To be specific, since a region grows only up to an adjacent pixel region at every iteration, it is necessary to have as many iterations as the vertical value or the horizontal value, whichever is larger. In addition, a region needs to be scanned as many times as the number of blocks of an entire image for a single iteration, the number of operations and the memory usage increase according to an image size. For example, the number of iterations required every time when the image size doubles increases twice, and thus the operations quadruple. Therefore, the degree of complexity of an image growing technique in a high-resolution large display having a great number of pixels of an image rapidly increases. Particularly, this kind of problem increases in a real time video processing systems that processes many images for a short period of time. If the number of iterations is limited, the region may not sufficiently grow, or a detection result of each frame may differ according to a change of a seed region.

SUMMARY

An aspect of the embodiments relates to providing an image forming apparatus for providing an accurate region detection result in a present frame with fewer operations and reduced memory usage by using a region detection result of a previous frame.

According to an embodiment, there is provided an image processing apparatus including a memory configured to store first region detection information corresponding to at least one object a first frame, and a processor configured to perform region growing processing based on a seed region identified from a second frame and the first region detection information and obtain second region detection information corresponding to at least one object the second frame, and perform image processing on the second frame based on the obtained second region detection information.

The processor may be further configured to, identify a first adjacent pixel region that is adjacent to the identified seed region and a second adjacent pixel region that is adjacent to a first pixel region corresponding to the first region detection information, perform region growing processing on the identified seed region based on a similarity between the identified seed region and the first adjacent pixel region, and perform region growing processing on the first pixel region based on a similarity between the first pixel region and the second adjacent pixel region.

The processor may be further configured to, add a third pixel region in which the similarity between the seed region and the first adjacent pixel region is a threshold value or more to a detection region, add a fourth pixel region in which the similarity between a third adjacent pixel region that is adjacent to the third pixel region and the third pixel region is a threshold value or more to the detection region, add a fifth pixel region in which the similarity between the first pixel region and the second adjacent pixel region is the threshold value or more to the detection region, and add a pixel region in which a similarity between a sixth adjacent pixel region that is adjacent to the fifth pixel region and the fifth pixel region is a threshold value or more to the detection region.

The processor may be further configured to, identify the second frame as a plurality of pixel blocks, identify whether each of pixel blocks in a first line among the plurality of pixel blocks corresponds to the seed region while identifying whether each of the pixel blocks is an adjacent pixel block of the seed region or an adjacent pixel block of a first pixel region to perform region detection, and perform region detection on each of pixel blocks in a second line after region detection on the first line is completed.

The processor may be further configured to perform region detection on the pixel blocks in the first line sequentially in a first direction, and perform region detection on the pixel blocks in the second line sequentially in a second direction different from the first direction.

The first region detection information may include first probability information in which each of a plurality of pixel blocks in the first frame is included in a detection region, wherein the second region detection information includes second probability information in which each of a plurality of pixel blocks in the second frame is included in the detection region, and wherein the processor is further configured to obtain the second probability information based on the first probability information and the seed region.

The first region detection information may include first identification information indicating whether each of a plurality of pixel blocks in the first frame is a detection region, wherein the second region detection information includes second identification information indicating whether each of a plurality of pixel blocks in the second frame is the detection region, and wherein the processor is further configured to obtain the second identification information based on the first identification information and the seed region.

The processor may be further configured to identify the second frame as a plurality of pixel blocks, and sequentially perform region detection on the plurality of pixel blocks, wherein the second region detection information includes a region detection result of the second frame with respect to a previously processed pixel block based on a present pixel block included in the second frame, and a region detection result of the first frame with respect to a pixel block to be processed.

The processor may be further configured to, based on obtaining the first region detection information, perform image processing on the first frame based on the first region detection information, and store the first region detection information in the memory, and perform image processing on the second frame based on the second region detection information and store the second region detection information in the memory.

The second region detection information may be obtained by updating the first region detection information stored in the memory based on a region detection result of the second frame.

The apparatus may further include a display, wherein the processor is further configured to control the display to sequentially display the first frame and the second frame on which image processing is performed, wherein the first frame on which image processing is performed includes an image-processed first region, wherein the second frame on which image processing is performed includes an image-processed second region, and wherein the image-processed second region includes the image-processed first region and a third region other than the image-processed first region.

The first frame and the second frame may be 4K Ultra High Definition (UHD) images or 8K UHD image frames.

The processor may be further configured to perform region expansion based on each seed region identified based on different color information, and perform image processing for each object region of a different color included in the second region detection information.

The processor may be further configured to obtain an output image which is image processed by applying the second frame and the second region detection information into a training network model, wherein the training network model is a model trained to apply an image processing for each object region of a different color.

The training network model may be a model trained to perform contrast adjustment for each object region of a different color.

According to an embodiment, there is provided an image processing method for an image processing apparatus, the method including storing first region detection information corresponding to at least one object a first frame, performing region growing processing based on a seed region identified from a second frame and the first region detection information, and obtaining second region detection information corresponding to at least one object the second frame, and performing image processing on the second frame based on the second region detection information.

The obtaining of the second region detection information may include, identifying a first adjacent pixel region that is adjacent to the seed region and a second adjacent pixel region that is adjacent to a first pixel region corresponding to the first region detection information, performing region growing processing on the seed region based on a similarity between the seed region and the first adjacent pixel region, and performing region growing processing on the first pixel region based on a similarity between the first pixel region and the second adjacent pixel region.

The obtaining of the second region detection information may include adding a third pixel region in which a similarity between the seed region and the first adjacent pixel region is a threshold value or more to a detection region, adding a fourth pixel region in which a similarity between a third adjacent pixel region that is adjacent to the third pixel region and the third pixel region is a threshold value or more to the detection region, adding a fifth pixel region in which a similarity between the first pixel region and the second adjacent pixel region is the threshold value or more to the detection region, and adding a pixel region in which a similarity between a sixth adjacent pixel region that is adjacent to the fifth pixel region and the fifth pixel region is a threshold value or more to the detection region.

The obtaining of the second region detection information may include identifying the second frame as a plurality of pixel blocks, identifying whether each of pixel blocks in a first line among the plurality of pixel blocks corresponds to the seed region while identifying whether each of the pixel blocks is an adjacent pixel block of a seed region or an adjacent pixel block of a first pixel region to perform region detection, and performing region detection on each of pixel blocks in a second line after region detection on the first line is completed.

The obtaining of the second region detection information may include performing region detection on the pixel blocks in the first line in the first direction sequentially, and performing region detection on the pixel blocks in the second line sequentially in a second direction from the first direction.

According to various embodiment, an accurate region detection result may be obtained with fewer operations. In other words, even if a seed region is different at every frame, a detection result may be consistent. In addition, the memory usage may be reduced due to fewer operations.

BRIEF DESCRIPTION OF THE DRAWINGS

FIG. 7A, FIG. 7B and FIG. 7C are views to explain an embodiment example of region detection information according to various embodiments of the disclosure;

DETAILED DESCRIPTION OF EXEMPLARY EMBODIMENTS

Figure 1:
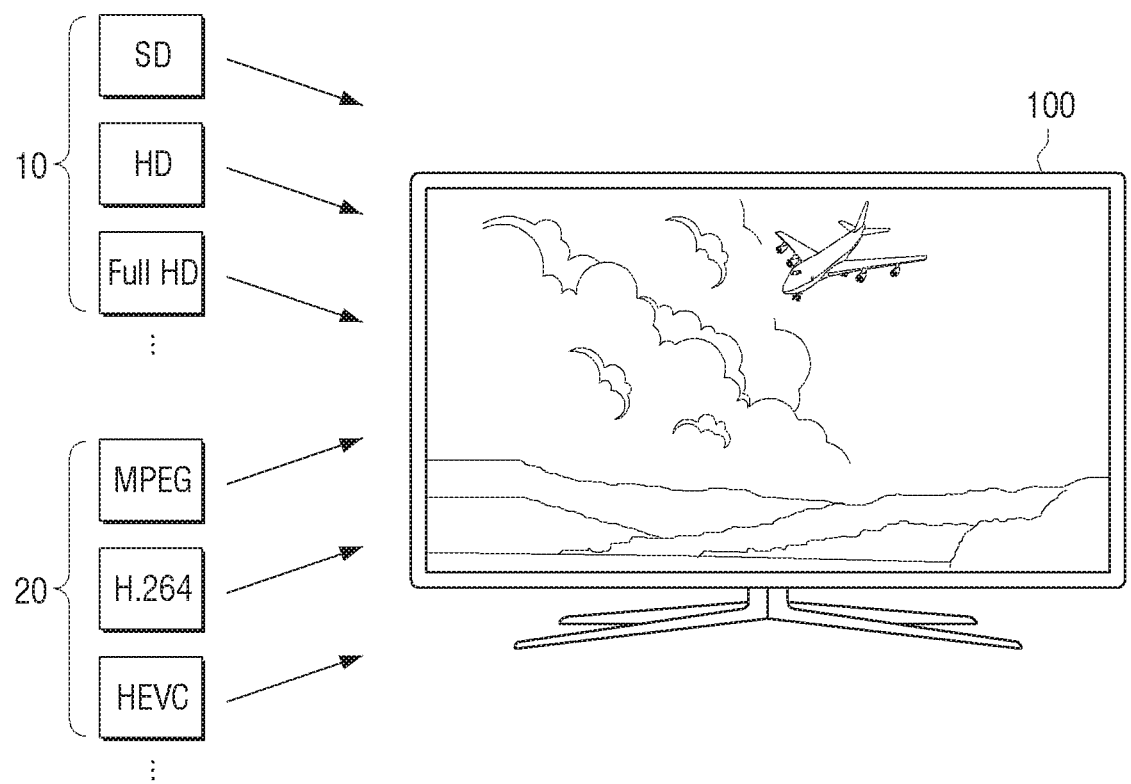
FIG. 1 is a view to explain an example embodiment of an image processing apparatus according to an embodiment of the disclosure.

Hereinafter, the disclosure will be described in detail with reference to the accompanying drawings.

The terms used in this specification will be briefly described, and the disclosure will be described in detail.

All the terms used in this specification including technical and scientific terms have meanings as would be generally understood by those skilled in the related art. However, these terms may vary depending on the intentions of the person skilled in the art, legal or technical interpretation, and the emergence of new technologies. In addition, some terms are arbitrarily selected. These terms may be construed in the meaning defined herein and, unless otherwise specified, may be construed on the basis of the entire contents of this specification and common technical knowledge in the art.

The disclosure is not limited to an embodiment disclosed below and may be implemented in various forms and the scope of the disclosure is not limited to the following embodiments. In addition, all changes or modifications derived from the meaning and scope of the claims and their equivalents should be construed as being included within the scope of the disclosure. In the following description, the configuration which is publicly known may be omitted.

The terms such as "first," "second," and so on may be used to describe a variety of elements, but the elements should not be limited by these terms. The terms are used simply to distinguish one element from other elements.

The singular expression also includes the plural meaning as long as it does not inconsistent with the context. In this specification, terms such as 'include' and 'have/has' should be construed as designating that there are such features, numbers, operations, elements, components or a combination thereof in the specification, not to exclude the existence or possibility of adding one or more of other features, numbers, operations, elements, components or a combination thereof.

In the disclosure, the expressions "A or B," "at least one of A and/or B," or "one or more of A and/or B," and the like include all possible combinations of the listed items.

In an exemplary embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

Hereinafter, embodiments of the disclosure will be described in detail with reference to the accompanying drawings so that those skilled in the art can easily carry out the embodiments. However, the disclosure may be embodied in many different forms and is not limited to the embodiments described herein. In order to clearly illustrate the disclosure in the drawings, some of the elements that are not essential to the complete understanding of the disclosure are omitted for clarity, and like reference numerals refer to like elements throughout the specification.

FIG. 1 is a view to explain an example embodiment of an image processing apparatus according to an embodiment of the disclosure.

An image processing apparatus 100 may be implemented as a TV as shown in FIG. 1, but is not limited to. Any type of apparatus could be used as long as it could perform image processing such as a set top box, a smart phone, a tablet PC, a laptop, a camera, a camcorder, a Head mounted Display (HMD), a near-eye display (NED), a large format display (LFD), a digital signage, a digital information display (DID), a video wall, a projector display, etc.

The image processing apparatus 100 may receive images of various resolutions or various compressed images. For example, the image processing apparatus 100 may receive any one of Standard Definition (SD), High Definition (HD), Full HD, or Ultra HD image (4K, 8K, 16K, 32K, etc.). Also, the image processing apparatus 100 may receive an image in a compressed form by MPEG (e.g., MP2, MP4, MP7, etc.), AVC, H.264, HEVC, and the like.

The image processing apparatus 100 may perform various image processing based on the characteristic of the received image. The image may be a digital image. A digital image may be an image in which an analog image is converted through sampling, quantization, coding, and the like. Digital images may be classified by arranging each pixel in a two-dimensional form using coordinates or matrix positions. The image processing may be digital image processing including at least one of image enhancement, image restoration, image transformation, image analysis, image recognition, or image compression.

The image processing apparatus 100 may perform image processing by dividing an entire image into objects or meaningful regions. That is, the image processing apparatus 100 may perform image processing at a high level rather than on a pixel basis. Specifically, the image processing apparatus 100 may identify a region based on at least one of the type or characteristic of each region included in the image, and apply a different parameter to each region to perform image processing on the image. For example, the image forming apparatus 100 may detect (or distinguish) a region based on the type (sky, mountain, field, person, building, etc.) or feature (texture, color, brightness, etc.) of each region, and perform an appropriate type of image processing on each region, or apply an appropriate parameter on each region to perform image processing. For example, when a low-resolution image such as Standard Definition (SD), High Definition (HD), or Full HD image is input, the image processing apparatus 100 may perform an enhancement process on a blurred texture in the process of enlarging from low-resolution to high-resolution such as a UHD image, or although a high-resolution image is input, the image processing apparatus 100 may perform a texture enhancement process to compensate for texture loss caused by image compression, etc.

The image forming apparatus 100 according to an embodiment may use a region detection result of a previous frame for region detection of a present frame. Hereinafter, various embodiments will be described with reference to drawings.

Figure 2A:
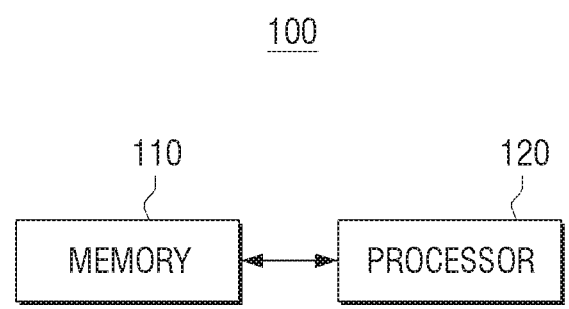
FIG. 2A is a block diagram to explain a configuration of an image processing apparatus according to an embodiment of the disclosure.

FIG. 2A is a block diagram to explain a configuration of an image processing apparatus according to an embodiment of the disclosure.

Referring to FIG. 2A, an image processing apparatus 100 may include a memory 110 and a processor 120.

The memory 110 may be electrically connected to the processor 120. The memory 110 may store data necessary for various embodiments of the disclosure. The memory 110 may be embodied as a memory embedded in the image processing apparatus 100 according to a data storage purpose, or a memory detachably attached to the image processing apparatus 100. For example, the data for driving the image processing apparatus 100 may be stored in the memory embedded in the image forming apparatus 100, and the data for the growing function of the image processing apparatus 100 may be stored in the memory detachably attached to the image processing apparatus 100. The memory embedded in the electronic apparatus 100 may be embodied with at least one of a volatile memory (e.g., dynamic RAM, (DRAM), or static RAM (SRAM), synchronous dynamic RAM (SDRAM), or the like), a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (such as NAND flash or NOR flash), a hard drive, or a solid state drive (SSD). The memory removable from the electronic apparatus 100 may be embodied with a memory card (e.g., a compact flash, a secure digital (SD), a micro secure digital (SD), a mini secure digital (SD), an extreme digital (xD), a multi-media card (MMC), or the like), an external memory connectable to a USB port (e.g., a USB memory), or the like.

According to an embodiment, the memory 110 may store an image received from an external device (e.g., a source device), an external storage medium (e.g., a USB), an external server (e.g., a web-hard), or the like. The image may be a digital image, but is not limited thereto.

The processor 120 may be electrically connected to the memory 110, and control the overall operations of the image forming apparatus 100.

According to an embodiment, the processor 120 may be implemented as a digital signal processor (DSP), a microprocessor, or a time controller (TCON), but is not limited thereto. The processor 120 may include one or more central processing unit (CPU), a microcontroller unit (MCU), a micro processing unit (MPU), a controller, an application processor (AP), or a communication processor (CP), an ARM processor, and the like, or may be defined by the corresponding terms. The processor 120 may be implemented as a system on chip (SoC), a large scale integration (LSI) with a built-in processing algorithm, or in the form of a field programmable gate array (FPGA). The processor 120 may perform various functions by executing computer executable instructions stored in the memory 120.

The processor 120 may identify a target region (or, a region of interest, or an object of interest) included in an image to perform image processing on a stored image or an image received in real-time. The term "region" of this specification may refer to a portion of an image, and it means at least one pixel block or a group of pixel blocks. In addition, a pixel block means a group of adjacent pixels including at least one pixel.

The processor 120 may detect at least one target region from each frame constituting an image, and perform image processing on the detected target region (hereinafter, a detection region). Hereinafter, information on the detection region will be referred to as region detection information.

The processor 120 according to an embodiment may obtain second region detection information corresponding to a second frame by using first region detection information obtained from a first frame. The first and second frames may constitute an image, and if the second frame is a frame to be processed, the first frame may be a previously processed frame. For example, when the image is a real-time streaming image, the first frame may be a frame previously streamed prior to the second frame. However, the disclosure is not limited thereto. The first frame may be a frame before a predetermined frame interval (e.g., a second frame interval) based on the second frame. Hereinafter, for ease of explanation, the first and second frames will be referred to as a previous frame and a present frame, respectively.

The region detection information may be information indicating a relationship between each pixel block and a detection region. The region detection information may be embodied in the form of map, mask, or look-up table. For example, the region detection information may include probability information that each pixel block is included in a detection region, or identification information indicating whether each pixel block is a detection region. For example, the region detection information may have a structure in which the probability information or the identification information is arranged in a matrix formation of a pixel block unit.

For example, the region detection information may be information including the probability that each pixel block is included in a detection region. For example, the probability information of each pixel block for a detection area may be presented by using specific bit information (e.g., 8 bit information (0 to 255)). The probability information of each pixel block may be presented by using percentage (%) number between 0 and 100.

For another example, the region detection information may be information that determines a pixel block included in a detection region as the first identification information (e.g., "1"), and a pixel block which is not included in a detection region as the second identification information (e.g., "0"). The region detection information may be embodied in the map format that gives identification information only to pixel blocks included in the detection region.

The processor 120 may obtain the second region direction information corresponding to a present frame by performing a region growing processing based on the seed region identified from the present frame (the second frame) and the first region detection information corresponding to a previous frame (the first frame). The seed region may be referred to an initial region. The seed region may refer to at least one pixel block or a group of pixel blocks identified according to a predetermined reference.

According to an embodiment, the second region detection information may be obtained by updating the first region detection information stored in the memory 110. The processor 120 may obtain the second region detection information by modifying the first region detection information stored in the memory 110 based on the region detection result of the second frame. For example, when the region detection processing on the second frame is completed, the first region detection information stored in the memory 120 may be updated to the second region detection information to reduce the memory usage.

The first region detection information corresponding to the first frame, which is a previous frame, may be obtained in the same manner as the second region detection information to be stored in the memory 110. The first region detection information may be obtained based on the seed region identified from the first frame and the third region detection information in the third frame. The third frame may be a previous frame of the first frame. However, when the first frame is the first frame of the image, the processor 120 cannot use the region detection information of a previous frame, so that it may perform a region growing processing only using the seed region identified from the first frame.

According to an embodiment, the processor 120 may identify a present frame as a plurality of pixel blocks, and identify whether each pixel block is a seed block, that is, whether each pixel block satisfies a predetermined reference. The identification of the seed region may be performed on each pixel block individually, and the identified seed region may be one pixel block, but could include a plurality of pixel blocks spaced apart from one another. For example, the processor 120 may detect a seed region using a pixel value analysis (e.g., variance, edge, color and/or texture) or a deep-leaning based AI technique.

For example, the processor 120 may detect a seed region based on color information (e.g., average pixel value, maximum pixel value, and minimum pixel value), brightness information, variance information, standard deviation information, edge information, texture information, etc. obtained based on a pixel value of each pixel block. For example, a variance may be calculated based on a pixel value of each pixel block, and a pixel block having the calculated variance smaller than a threshold value may be identified as a flat region. For another example, the processor 120 may identify the pixel block as a sky region if an average value of a specific pixel block is a bluish close to sky color. For another example, the processor 120 may identify the pixel block as a texture region if a variance value of a specific pixel block is large, and a direction of an edge is inconsistent. The processor 120 may identify a mountain region, a rock region, etc. based on the color information of the texture region.

For another example, the processor 120 may identify a seed region using a deep-learning based artificial intelligence neural network (or a deep artificial neural network), that is, a training network model. The training network model may mean that a basic artificial intelligence model trains using a plurality of training data by training algorithm. The training may be performed by a device itself that performs artificial intelligence according to an embodiment, or by a separate server and/or system. Examples of the training algorithm may include a supervise learning, an unsupervised learning, a semi-supervised learning, or a reinforcement learning, but the disclosure is not limited thereto. The training network model may be designed to obtain output data desired by a user through concessive multiplication calculation on an input image, and embodied as a system for training numerous images. A training network model for detecting an object may predict the location, size, and name of specific objects of meaningful texts on the input image.

Figure 2B:
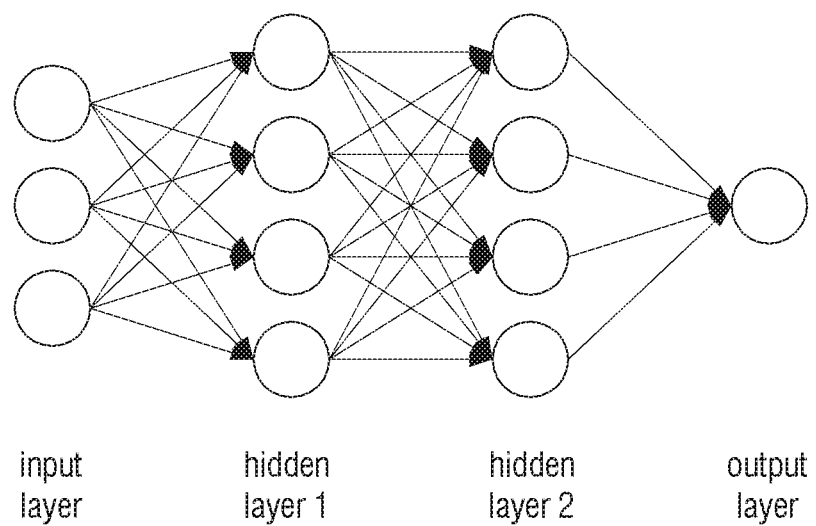
FIG. 2B is a diagram of a neural network according to an embodiment of the disclosure.
Figure 2C:
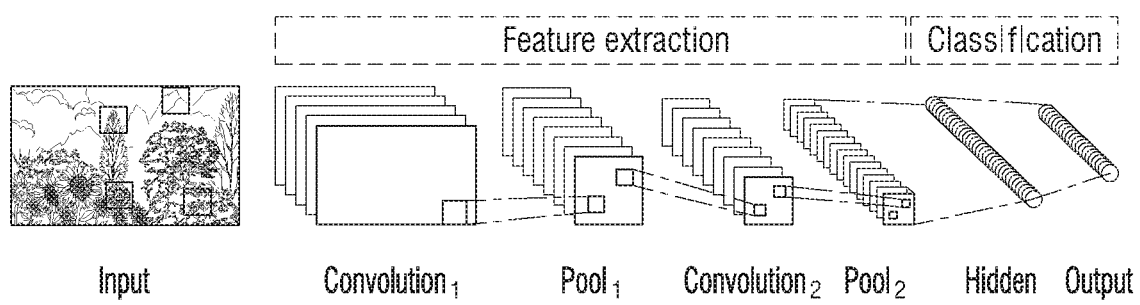
FIG. 2C is a diagram of a neural network according to an embodiment of the disclosure.

Referring to FIG. 2B, the training network model may consist of a plurality of neural network layers. Each of the plurality of neural network layers may include a plurality of weight values, and perform calculation of values through the calculation result of a previous layer, and calculation between the plurality of weight values. The plurality of weights included in the plurality of neural network layers may be optimized by the training result of the artificial intelligence model. For example, the plurality of weight values may be renewed so that a loss value or a cost value obtained from the artificial intelligence model during the training may be reduced or minimized. The artificial neural network may include a Deep Neural Network (DNN), for example, Convolutional Neural Network (CNN) referring to FIG. 2C, Recurrent Neural Network (RNN), Long Short Term Memory Network (LSTM), Gated Recurrent Units (GRU), (e.g., REDMON, Joseph; FARHADI, Ali. Yolov3: An incremental improvement. arXiv preprint arXiv: 1804.02767, 2018)), Restricted Boltzmann Machine (RBM), Deep Belief Network (DBN), Bidirectional Recurrent Deep Neural Network (BRDNN), Deep Q-Networks, or the like, but the disclosure is not limited thereto. For example, the processor 120 may identify a seed region included in each image frame by executing a general process such as CPU, AP, Digital Signal Processor (DSP), etc. a graphic processor such as GPU, Vision Processing Unit (VPU), etc. or an artificial intelligence process such as Neural Processing Unit (NPU).

The processor 120 may obtain the second region detection information corresponding to a present frame by performing a region growing processing based on the seed region identified from the present frame (the second frame) and the first region detection information of the previous frame (the first frame). The region growing processing may refer to repeatedly selecting and processing blocks in a detection region even if they are not selected as seed regions. The region growing processing may be used because it is difficult to detect a detection region all together at once.

To be specific, the processor 120 may identify an adjacent pixel region which is adjacent to the identified seed region and a first pixel region corresponding to the first region detection information. The processor 120 may identify the first adjacent pixel region that is adjacent to the identified seed region, and the second adjacent pixel region that is adjacent to the first pixel region. The adjacent pixel region may be at least one peripheral pixel region surrounding a specific pixel region.

According to an embodiment, the processor 120 may identify the second frame as a plurality of pixel blocks, identify a seed block and a pixel block corresponding to the first region detection information, among the plurality of pixel blocks, and identify an adjacent pixel block of the identified pixel blocks. For example, when a seed region is a single pixel block, the adjacent pixel region may include 8 (eight) pixel blocks adjacent to the pixel block in the upper, lower, left, right the diagonal directions. The adjacent pixel region may include 4 (four) pixel blocks adjacent to the pixel block in the upper, lower, left and right directions. The adjacent pixel region may include 6 (six) pixel blocks including pixel blocks in the upper, lower, left, right, upper left diagonal, and upper right diagonal directions of the pixel block. The adjacent pixel block may include 6 (six) pixel blocks including pixel blocks in the upper, lower, left, right, upper right diagonal, and lower left diagonal directions of the pixel block.

The processor 120 may perform a region growing processing on a seed region based on the similarity between the seed region and the first adjacent pixel region, and perform a region growing processing on the first pixel region based on the similarity between the first pixel region and the second adjacent pixel region.

For example, the processor 120 may add the third region having the similarity between the seed region and the first adjacent pixel region of a threshold value or more to a detection region (or an additional seed region), and add the fourth region having the similarity between the third adjacent pixel region that is adjacent to the third pixel region and the third pixel region of a threshold value or more to a detection region. The processor 120 may add the fifth region having the similarity between the first pixel region and the second adjacent pixel region of a threshold value or more to a detection region, and add a pixel region having the similarity between the sixth adjacent pixel region that is adjacent to the fifth pixel region and the fifth pixel region of a threshold value or more to a detection region.

The processor 120 may identify whether each pixel block in the first line among a plurality of pixel blocks constituting the second frame is a seed region, identify whether each pixel block is an adjacent pixel block of a seed region or an adjacent pixel block of the first pixel region, determine the similarity based on the above, and perform region detection. The processor 120 may not perform a region growing processing after seed region detection, but may perform seed region detection and region growing processing at the same time in the order of each pixel block. Accordingly, in this specification, the seed region and the region growing processing will be incorporated and referred to as region detection (or region detection process).

The processor 120 may perform region detection in the same manner as the first line on each of the pixel blocks in the second line after the region detection on the first line is completed. The first line may be followed by the second line. However, the disclosure is not limited thereto. The second line may be spaced apart from the first line by a predetermined interval.

According to an embodiment, the processor 120 may sequentially perform region detection on pixel blocks in the first line in the first direction, and sequentially perform region detection on pixel blocks in the second line in the first direction. For example, the processor 120 may sequentially perform region detection on the pixel blocks in the first line and the pixel blocks in the second line from the left to the right.

According to an embodiment, the processor 120 may sequentially perform region detection on the pixel blocks in the first line in the first direction, and sequentially perform region detection on the pixel blocks in the second in the second direction different from the first direction. For example, the processor 120 may sequentially perform a region growing processing on the pixel blocks in the first line from the left to the right, and sequentially perform a region growing processing on the pixel blocks in the second line from the right to the left. For another example, the processor 120 may sequentially perform region detection on the pixel blocks in the first and second lines from the left to the right, and sequentially perform region detection on the pixel blocks in the third and fourth lines from the right to the left.

The processor 120 may apply the similarity reference similar to or different from the reference used for seed region detection for determining a similarity for performing a region growing processing.

According to an embodiment, the processor 120 may measure the similarity through pixel value analysis. For example, the processor 120 may measure the similarity between information respectively corresponding to adjacent pixel blocks such as color information (e.g., average pixel value, maximum pixel value, and minimum pixel value), intensity information, histogram (e.g., histogram information, variance information, standard deviation information, edge information, texture information, and the like) obtained based on the pixel value of the seed region (or the first pixel region).

For example, when the processor 120 measures the similarity based on the variance, the processor 120 may compare the first variance of the seed region with the second variance of each of adjacent pixel blocks, and add an adjacent pixel block having a difference smaller than a threshold value as a detection region.

The processor 120 may obtain a similarity between a specific pixel block and an adjacent pixel block based on various cost functions. For example, Mean Square Error (MSE), Sum of Absolute Difference (SAD), Median Absolute Deviation (MAD), Correlation, and the like may be used. For example, the correlation may be calculated as a constant value, meaning that the two variables x and y are assumed to be related to each other, and the degree of the relationship may be expressed by a value called a correlation coefficient. As another example, the MSE of the target pixel block may be calculated, and the similarity between the target pixel block and the adjacent pixel block may be obtained from the MSE viewpoint. For example, the similarity may be determined based on the MSE difference.

The processor 120 may perform region detection on the second frame based on the first region detection information corresponding to the first frame. Accordingly, the second region detection information obtained in real time while the pixel blocks in the second frame are sequentially processed may include the region detection result of the second frame for the pixel block processed before the present pixel block in the second frame, and include the region detection result of the first frame for the pixel block to be processed. In addition, the region detection result of the second frame may be included until the processing of the present pixel block is completed, and the region detection result of the first frame may be included after the processing is completed.

When region detection information is obtained by each frame according to the above-described method, the processor 120 may obtain an output image by performing image processing on each frame based on the obtained region detection information. In this case, the image processing of the first frame and the region detection processing of the second frame may be performed independently of each other. For example, the image processing of the first frame and the region detection processing of the second frame may be performed in parallel or sequentially. According to an embodiment, the processor 120 may obtain an output image by performing texture enhancement process on a flat region after detecting a flat region. The output image may be an Ultra High Definition (UHD) image, in particular a 4K UHD image or an 8K UHD image, but is not limited thereto.

FIG. 3A, FIG. 3B, FIG. 4A, FIG. 4B, FIG. 5A and FIG. 5B are views to explain a region detection method according to an embodiment of the disclosure.

Referring to FIG. 3A, FIG. 3B, FIG. 4A, FIG. 4B, FIG. 5A, and FIG. 5B, for ease of explanation, it is assumed that a detection region is a heart shape, and region detection information includes identification information.

Figure 3A:
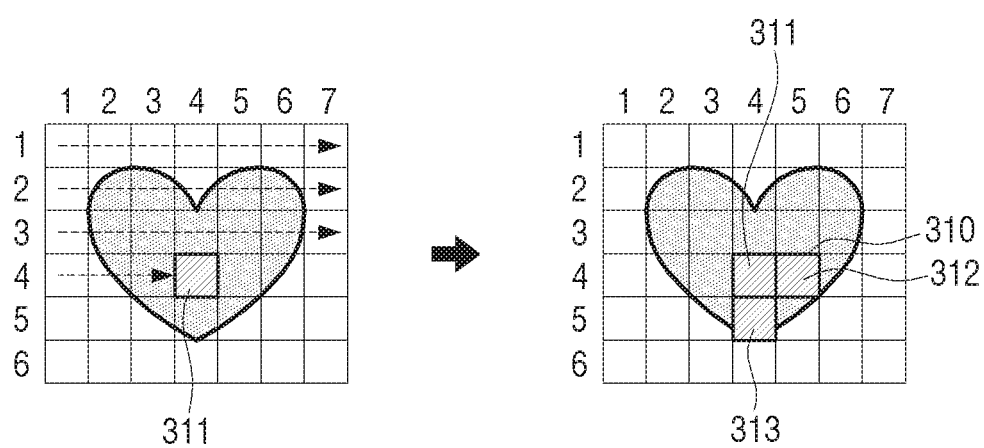
FIG. 3A, FIG. 3B, FIG. 4A, FIG. 4B, FIG. 5A and FIG. 5B are views to explain a region detection method according to an embodiment of the disclosure.
Figure 3B:

FIG. 3A and FIG. 3B are views to explain a region detection method in the first frame according to an embodiment of the disclosure. The first frame may be the first frame of an image.

Referring to FIG. 3A, the processor 120 may identify the first frame as a plurality of pixel blocks, and perform seed region identification and region growing processing (hereinafter, region detection) by scanning each pixel block in a predetermined direction on a predetermined line basis. For ease of explanation, FIG. 3A illustrates that the first frame is identified as 7*6 pixel blocks.

For example, the processor 120 may perform region detection by scanning pixel blocks from the left to the right on a pixel block line basis. However, the disclosure is not limited thereto. It is also possible to perform region detection by scanning pixel blocks from the right to the left in a pixel block line basis.

For example, the processor 120 may identify whether a pixel block is a seed region from (1, 1) block in the first frame, and perform a region growing processing on the pixel block. However, there is no region detection information on a previous frame in the first frame, and thus a region growing processing may not be performed until a first seed region is detected.

When the region detection processing on the first line is completed, the processor 120 may perform the region detection processing on the next line in the same manner. For example, when (4, 4) block 311 is the only seed region in the first frame, there is no detection block until the (4, 4) block 311 is detected as a seed region. For example, referring to FIG. 3B, when identification information "1" is given to a pixel block included in a detection region, and identification information "0" is given to other pixel blocks to generate a detection map, (1, 1) to (4, 3) blocks may have the identification information "0".

When the (4, 4) block 311 is detected as the seed region, the seed region detection and the region growing processing may be performed simultaneously from the (5, 4) block. That is, the processor 120 may identify whether it is a seed region from the (5, 4) block, identify whether it is an adjacent pixel of the (4, 4) block, and identify the similarity of an adjacent pixel.

Referring to FIG. 3A, a total of three regions 310 may be detected by a region growing processing to (5, 4) block 312 and (4, 5) block 313, and referring to FIG. 3B, the first region detection information 410 corresponding to the first frame may be obtained. However, the (5, 4) block 312 may be a region extending from the (4, 4) block 311 which is a seed region, but the (4, 5) block 313 may be a region extending from the (4, 4) block 311 or the (5, 4) block 312.

Figure 4A:
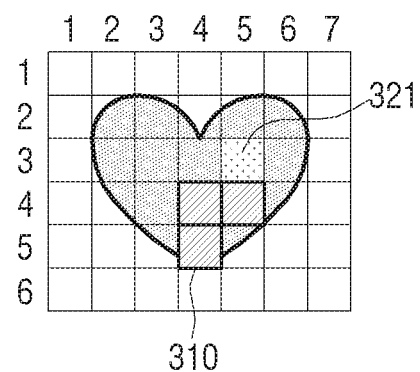
Figure 4A:
Figure 4A:
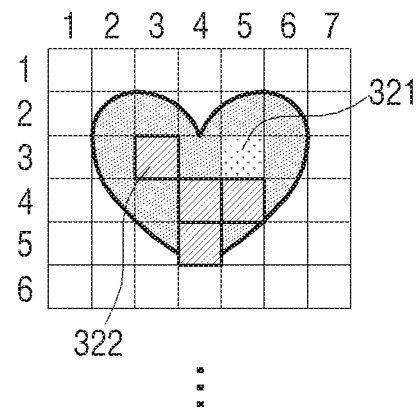
Figure 4A:
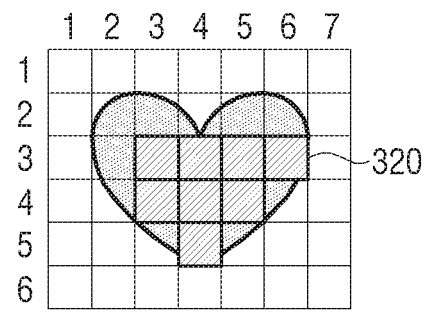
Figure 4B:

FIG. 4A and FIG. 4B are view to explain a method for region detection in a second frame after a first frame shown in FIGS. 3A and 3B.

Referring to FIG. 4A, the processor 120 may identify whether a pixel block is a seed region from (1, 1) block included in the second frame, and perform a region growing processing at the same time. In this case, the processor 120 may use first region detection information obtained from the first frame. The processor 120 may perform region detection with information on three pixel blocks 310 detected from the first frame. For example, the processor 120, referring to FIG. 4B, may perform region detection based on the first region detection information 410.

According to an embodiment, the processor 120 may modify the first region detection information 410 by sequentially scanning pixel blocks from the (1, 1) block in the second frame. For example, it is assumed that (5, 3) block 321 is the only seed region in the second frame. According to the first region detection information 410, detected region information may be included from the fourth lines, and thus the region growing processing may not be performed up to the second line. However, the seed region detection may be performed independently, so that it is possible to detect a seed region from all lines. However, since the (5, 3) block 321 is assumed to be the only seed region in the second frame, the region growing processing may not be performed up to the second line.

When the processor 120 detects (performs a region growing processing on) (3, 3) block 322 based on the (4, 4) block included in the first region detection information 410, the (3, 3) block 322 may be added as a detection region. For example, the first region detection information 410 may be modified 410-1 so that the (3, 3) block 322 may have the identification information "1". That is, the pixel blocks included in the third line such as (3, 3), (4, 3) blocks processed before the seed region (5, 3) block 321 may grow as the detection regions.

The processor 120 may continue to perform a region growing processing while identifying each pixel block is a seed region. The processor 120 may detect the (5, 3) block 321 as the seed region in the order of (5, 3) block 321. However, the pixel block 321 may also be added by performing a region growing processing by measuring a similarity. Referring to FIG. 4A, the region detection may be sequentially performed for each pixel block, and eventually, the detection region of the eight pixel blocks 320 may be identified. For example, as shown in FIG. 4B, when the region detection processing for all the pixel blocks is completed while the first region detection information 410 is continuously modified, the second region detection information 420 corresponding to the second frame may be obtained.

Figure 5A:
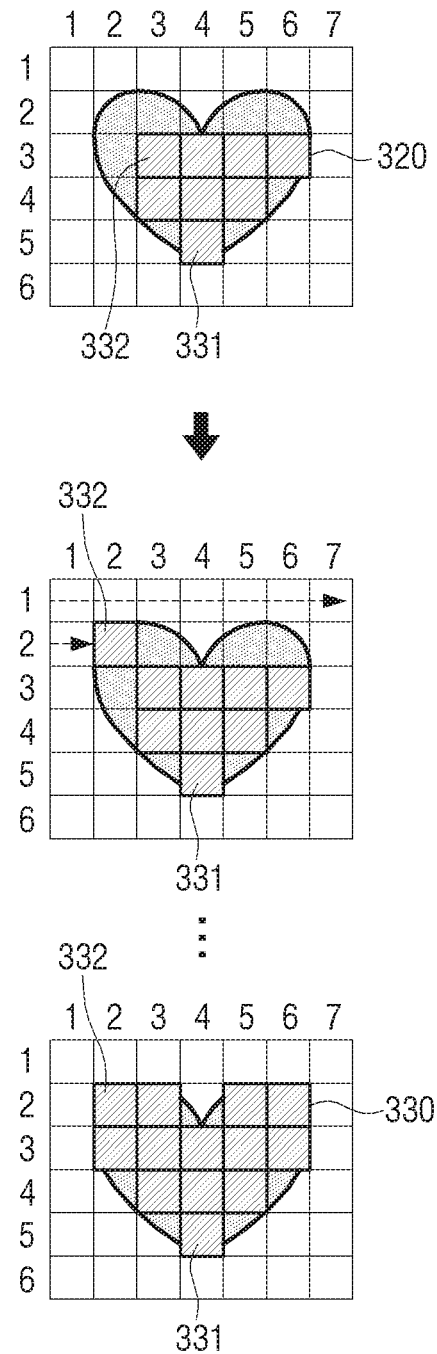
Figure 5B:

FIG. 5A and FIG. 5B are views to explain a region detection method in the third frame after the second frame shown in FIG. 4A and FIG. 4B.

Referring to FIG. 5A, the processor 120 may perform a region growing processing while identifying a seed region from the (1, 1) block included in the third frame sequentially. The processor 120 may perform region detection based on information on eight pixel blocks 320 detected by the second frame. For example, the processor 120 may perform region detection based on the second region detection information 420 as shown in FIG. 5B.

According to an embodiment, the processor 120 may modify the second region detection information 420 while sequentially scanning blocks from (1, 1) block included in the third frame. For example, it is assumed that (4, 5) block 331 is only the seed region in the third frame. According to the second region detection information 420, since region information detected from the third line is included, the region growing processing cannot be performed until the first line. However, since the seed region detection is different, the seed region detection can be performed in all lines. However, the (4, 5) block 331 may be the only seed region in the third frame, and thus the region growing processing may not be performed up to the first line.

When the processor 120 detects (performs a region growing processing on) the (3, 3) block 322 included in the second line based on the (3, 3) block included in the second region detection information 420, the (3, 3) block 332 may be added as a detection region. For example, the second region detection information 420 may be modified 420-1 so that the (3, 3) block 332 may have the identification information "1". That is, the pixel blocks included in the second line such as (2, 2), (3, 2), (5, 2), (6, 2) blocks, etc. processed before the (4, 5) block 331 may grow as detection regions.

The processor 120 may perform a region growing processing while identifying whether each pixel block is a seed region continuously. The processor 120 may detect the (4, 5) block 331 as a seed region in the order of (4, 5) block 331, but the pixel block 331 may be added by performing a region growing processing through similarity measurement. Referring to FIG. 5A, region detection on pixel blocks has been sequentially performed, and 13 (thirteen) pixel blocks 330 have been identified as detection regions. For example, referring to FIG. 5B, when the second region detection information 420 is continuously modified and the region detection process on all the pixel blocks is completed, the third region detection information 430 corresponding to the third frame may be obtained.

The processor 120 may perform image processing based on the region detection information obtained in the processing order of each frame, and display the image processed frames on a display provided in the image processing apparatus 100 sequentially, or transmit the frames to an external device including the display. In this case, the detection regions may grow sequentially in each frame, so that the region in which the same image processing is performed may gradually grow in each output frame. For example, the first frame may include the image-processed first region, and the second frame after the first frame may include the second region which is subjected to the image processing in the same manner as the first region. The second region may include the first region and a third region which is subjected to the image processing in the same manner as the first region. In addition, the third frame after the second frame may include a fourth region which is subjected to the image processing in the same manner as the second region, where the fourth region may include the second region and a fifth region other than the second region.

According to the above-described embodiment, it has been described that the second region detection information is obtained by updating the first region detection information corresponding to a previous frame based on the region detection result of a present frame, but it is only exemplary. The method for obtaining region detection information may vary. For another example, region detection information of a present frame may be nearly generated by using region detection information of a previous frame, not replacing and modifying the region detection information of the previous frame. For example, only the information corresponding to a target detection region in a previous frame (e.g., identification information "1") may be used, and with regard to the remaining regions, information may be newly generated based on the region detection result of the present frame.

Unlike the above-described embodiment, the processor 120 may perform region expansion process using a deep-learning based artificial neural network (or a deep artificial neural network), that is, a training network model. The training network model may be a model trained to estimate whether each pixel region included in an input image is the same object.

According to an embodiment, the training network model may be a model trained by receiving a plurality of training pixel models included in the same object. Accordingly, when an image is input into a training network model, the training network model may output possibility information on whether each pixel block corresponds to the same object.

According to another embodiment, the training network model may be a model trained by receiving a plurality of pixel blocks included in a present training frame included in the same object and region detection information of a previous frame. Accordingly, when region detection information of an object frame and a previous frame is input into a training network model, the training network model may output possibility information on whether each pixel block of the object frame corresponds to the same object.

Figure 6A:
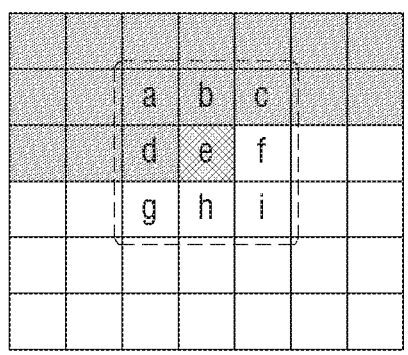
FIG. 6A and FIG. 6B are detailed views to explain a method for processing a pixel block according to an embodiment of the disclosure.
Figure 6B:
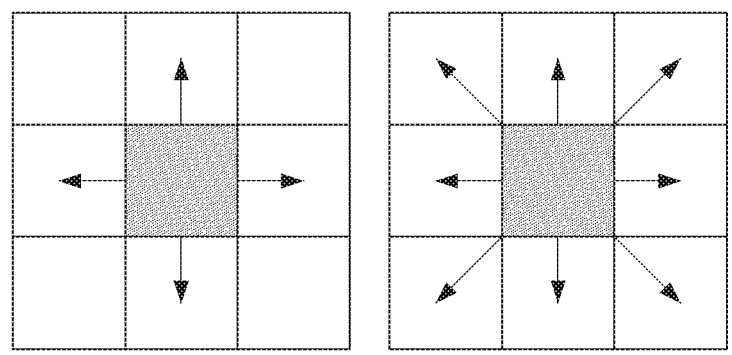
Figure 6B:
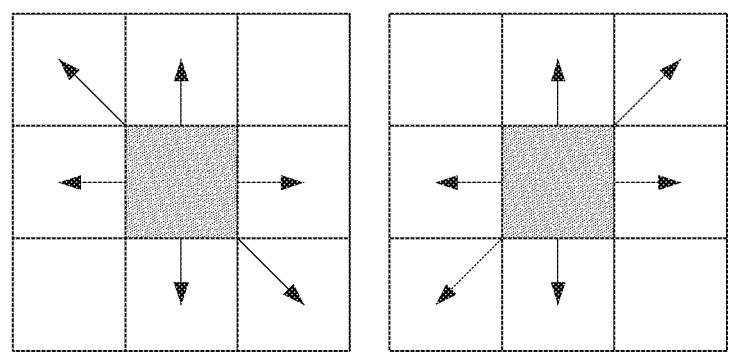

FIG. 6A and FIG. 6B are detailed views to explain a method for processing a pixel block according to an embodiment of the disclosure.

According to an embodiment, the region detection information obtained in real time while performing the region detection for the present frame may include the region detection result of the present frame for the pixel block previously processed based on the present pixel block included in the present frame, and include the region detection result of the previous frame for the pixel block to be processed.

For example, assuming that (4, 3) block (e) is a present pixel block as shown in FIG. 6A, the processor 120 may identify whether the e block is a seed region, and whether there is a region which has been already detected and is similar to the e block among adjacent pixel blocks (a to d, and f to i) of the e block. Even if the e block is not the seed region, if there is a region which has been already detected and is similar to the e block among the adjacent pixel blocks (a to d, and f to i) of the e block, the processor 120 may add the e block as a detection region. According to an embodiment of the disclosure, the image-processed a, b, c, and d blocks located on the upper and left sides of the present frame, among the adjacent pixel blocks (a to d, and f to i) of the block, may have the detection result of the present frame, and the e-block to be processed at present, and the f, g, h, and i blocks located on the bottom and right sides where detection processing has not yet been performed may have detection results of the previous frame. However, according to the related art, there is a difference in that all nine adjacent pixel blocks adjacent to the e block have detection results in the present frame.

Meanwhile, according to the above-described embodiment, it is assumed that an adjacent pixel block includes 9 (nine) pixel blocks in the periphery of a present pixel block, but the disclosure is not limited thereto. For example, referring to FIG. 6B, an adjacent pixel region may be selected based on various connectivity with a present pixel block.

Figure 7C:
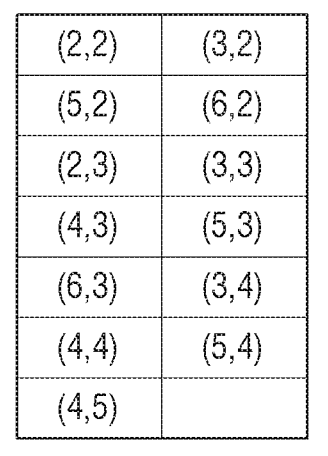

FIG. 7A, FIG. 7B and FIG. 7C are views to explain an embodiment example of region detection information according to various embodiments of the disclosure.

According to an embodiment, region detection information may be configured in the form of a matrix of pixel block units as detection units, and each pixel block may include identification information indicating whether it has been detected. For example, referring to FIG. 7A, the detected block may include first identification information (e.g., "1"), and other blocks may include second identification information (e.g., "0").

According to another embodiment, region detection information may be configured in the form of pixel block units as detection units, and each pixel block may include a probability on a block to be detected. For example, referring to FIG. 7B, region detection information may include probability information corresponding to each pixel block in the form of 8 bit information (figures between 0 and 255). However, the disclosure is not limited thereto. The region detection information may include % information (figures between 1 and 100).

Meanwhile, the processor 120 may select the final probability information using a maximum value or an average value among a plurality of probability information for a specific pixel block. For example, the processor 120, when the probability that the specific pixel block is a seed region (in the case of 1 to 100 values) is 90, and the probability by a region growing processing is 95, 91, and 92, may select the maximum value of 95 as the final probability information, or the average value of 92 as the final probability information. When the region detection information includes the probability information, each probability information may be used as weighted value information for performing various image processes. For example, the processor 120 may normalize the probability information corresponding to each pixel block to a value between 0 and 1, and use the information as weighted values for performing a sharpness process, a texture process, etc.

According to another embodiment, region detection information may be embodied in the form of a look-up table including identification information of pixel blocks included in the detection region as shown in FIG. 7C.

FIG. 8A, FIG. 8B, FIG. 8C, FIG. 9A, and FIG. 9B are views to explain a region detection order according to various embodiments of the disclosure.

According to an embodiment, the processor 120 may process sequentially and consistently process pixel blocks in each pixel block line in a predetermined direction (referred to as "raster scan"). For example, the processor 120, as shown in FIG. 8A, may process pixel blocks in the first line from the left side to the right side, and process pixel blocks in the remaining line from the left to the right.

According to an embodiment, the processor 120 may sequentially process pixel blocks by alternately changing the directions in each pixel line (referred to as "zig-zag scan"). For example, referring to FIG. 9B, pixel blocks may be processed from the left to the right in an odd line, and from the right to the left in an even line. However, it is also possible to process pixel blocks from the right to the left in the odd line and from the left to the right in the even line.

According to another embodiment, the processor 120 may process pixel blocks sequentially by alternately changing directions in a line unit of a predetermined interval. For example, referring to FIG. 8C, the processor 120 may process the pixel blocks from the left to the right in the first and second lines, and process the pixel blocks from the right to the left in the third and fourth lines.

Figure 8A:
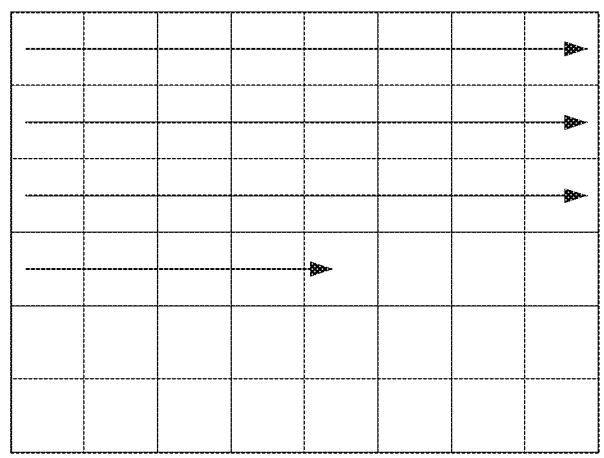
FIG. 8A, FIG. 8B, FIG. 8C, FIG. 9A, and FIG. 9B are views to explain a region detection order according to various embodiments of the disclosure.
Figure 8B:
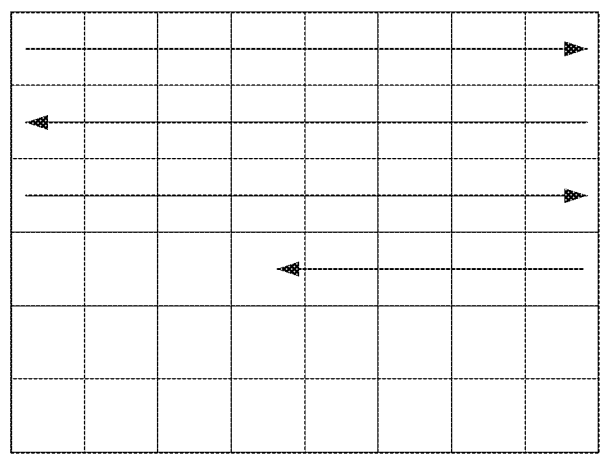
Figure 8C:
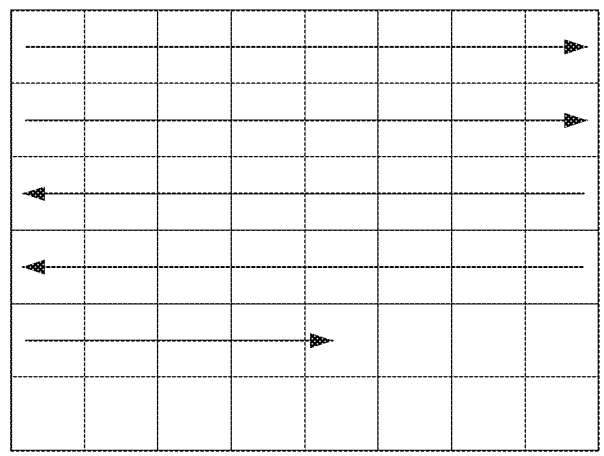
Figure 9A:
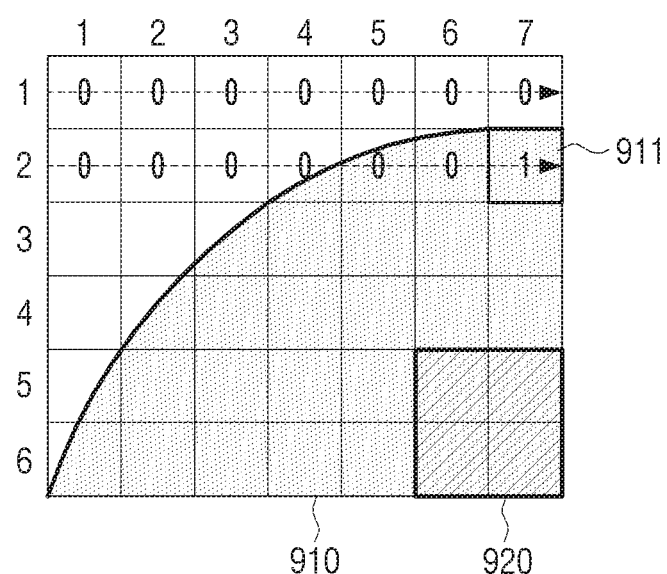
Figure 9B:
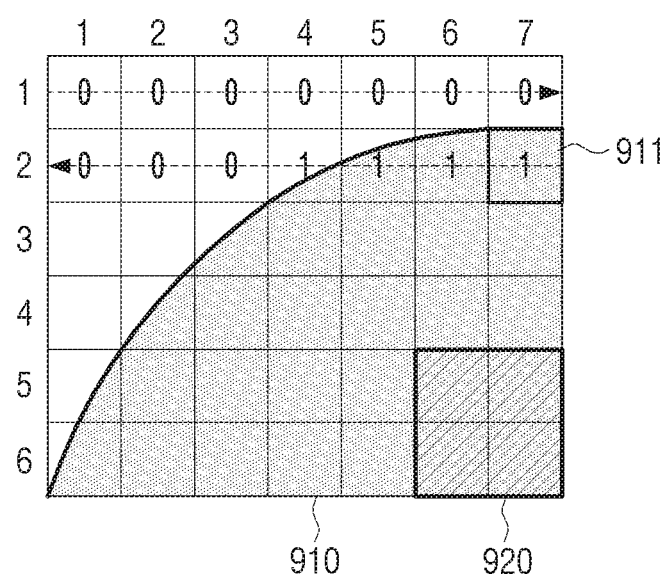

FIG. 9A and FIG. 9B are views to explain a detection result according to a detection method of FIG. 8A and FIG. 8B.

As shown in FIGS. 9A and 9B, it is assumed that a specific region 910 is a detection object, (7, 2) block 911 in the present frame is the only seed region, and detection regions detected in a previous frame are (6, 5), (7, 5), (6, 6), and (7, 6) pixel blocks.

According to an embodiment, when the processor 120 uses the "raster scan" method shown in FIG. 8A, it is impossible to detect a region before the seed region 911 is detected, that is, the (7, 2) block 911 is processed as shown in FIG. 9A. Therefore, only the (7, 2) block 911 may be detected in the second line.

According to another embodiment, when the processor 120 uses the "zig-zag scan" method shown in FIG. 8B, after detecting the seed region 911 as shown in FIG. 9B, (7, 2), (6, 2), (5, 2), and (4, 2) blocks may be detected in the second line because the (6, 2), (5, 2), and (4, 2) blocks are sequentially detected by performing a region growing processing. Accordingly, the region growing speed may increase faster than the "raster scan" method without additional operation or memory.

Figure 10:
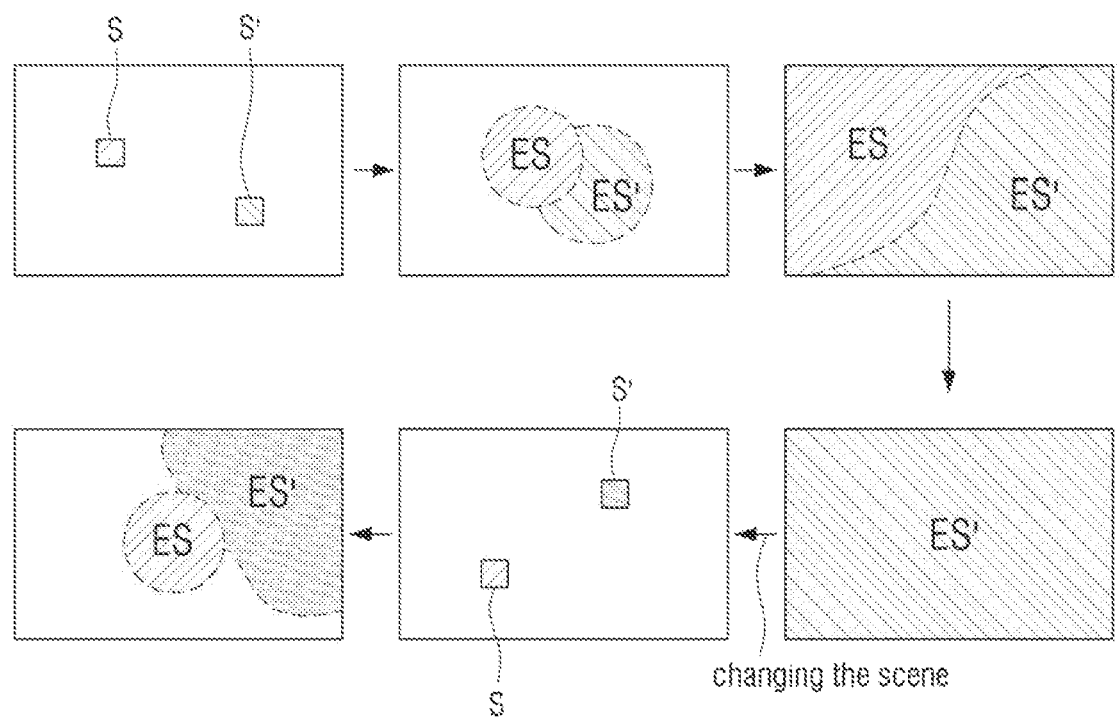
FIG. 10 is a view to explain a scene detection method according to an embodiment of the disclosure.

FIG. 10 is a view to explain a scene detection method according to an embodiment of the disclosure;

Referring to FIG. 10, the processor 120 may detect a seed region S and non-seed region S', and perform region expansion on the seed region S and the non-seed region S'. The non-seed region S' may be an area including a characteristic of a pixel value (e.g., variance, edge, color and/or texture) completely different from the seed region. The non-seed region S' may be detected by pixel value comparison between the seed region S, or detected through a deep-learning based AI technology.

The processor 120 may perform region expansion on a present frame based on region detection information of a previous frame, that is, seed region S based region detection information and non-seed region S' based region detection information.

For example, referring to FIG. 10, the processor 110 may identify a seed region S and a non-seed region S' in a first frame, and perform region expansion on each of the seed region S and the non-seed region S' based on the region expansion method according to an embodiment of the disclosure. That is, when region expansion on each region is performed based on the region detection information of the previous frame, the processor 120 may detect a frame without an object detected based on the seed region S at some point. For example, the processor 120 may identify a frame including only an region ES' expanded based on the non-seed region S' without including an region ES expanded based on the seed region S. In this case, the processor 120 may determine that the scene is changed in the corresponding frame.

Figure 11:
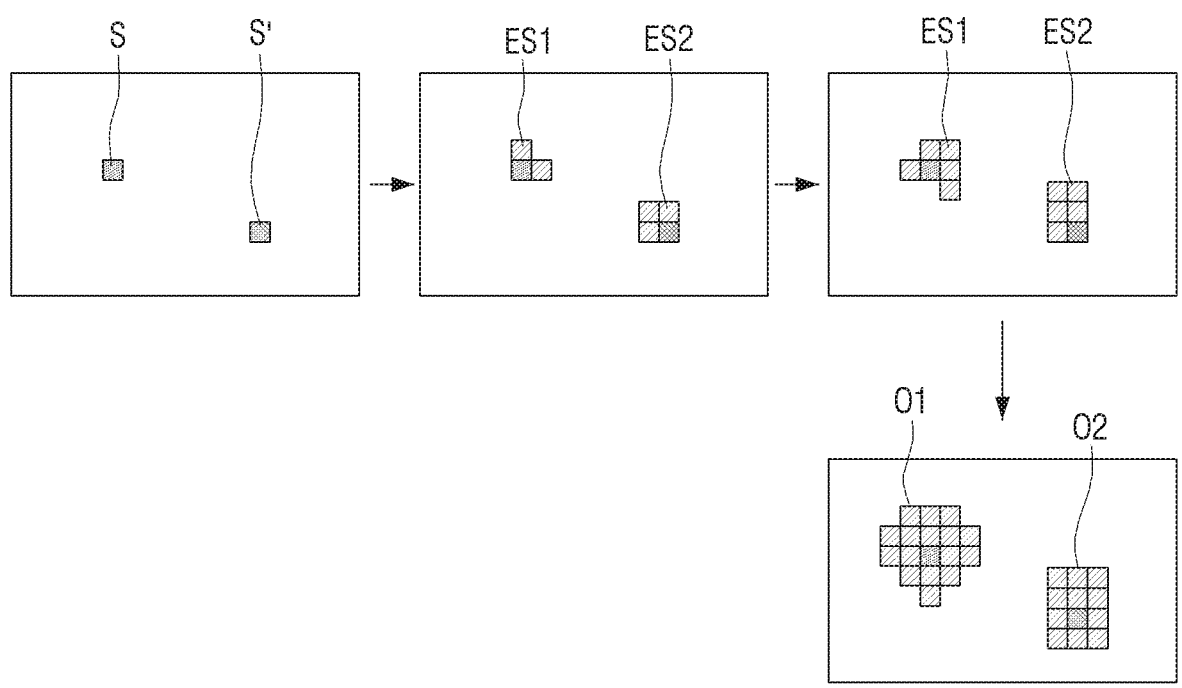
FIG. 11 is a view to explain a method for detecting a plurality of objects according to an embodiment of the disclosure.

FIG. 11 is a view to explain a method for detecting a plurality of objects according to an embodiment of the disclosure.

Referring to FIG. 11, the processor 120 may detect a plurality of seed regions in one image frame, particularly, seed regions respectively corresponding to different objects. In some cases, a plurality of seed regions may be detected in one object, but according to an embodiment, for ease of explanation, it is assumed that only a single seed region is detected with respect to a single object.

For example, the processor 120 may detect a pixel block having a first pixel value based on pixel value information (e.g., at least one of color information, brightness information, variation information, standard deviation information, edge information or texture information) on a pixel block basis as a first seed region S, and a pixel block having a second pixel value different from a first pixel value as a second seed region S'. In this case, the second pixel value different from the first pixel value may be identified based on predetermined threshold information (e.g., a predetermined threshold grayscale range).

Referring to FIG. 11, the processor 120 may detect a plurality of object regions 01 and 02 by performing region expansion ES1 and ES2 according to an embodiment of the disclosure based on each of the first and second seed regions S1 and S2.

Figure 12A:
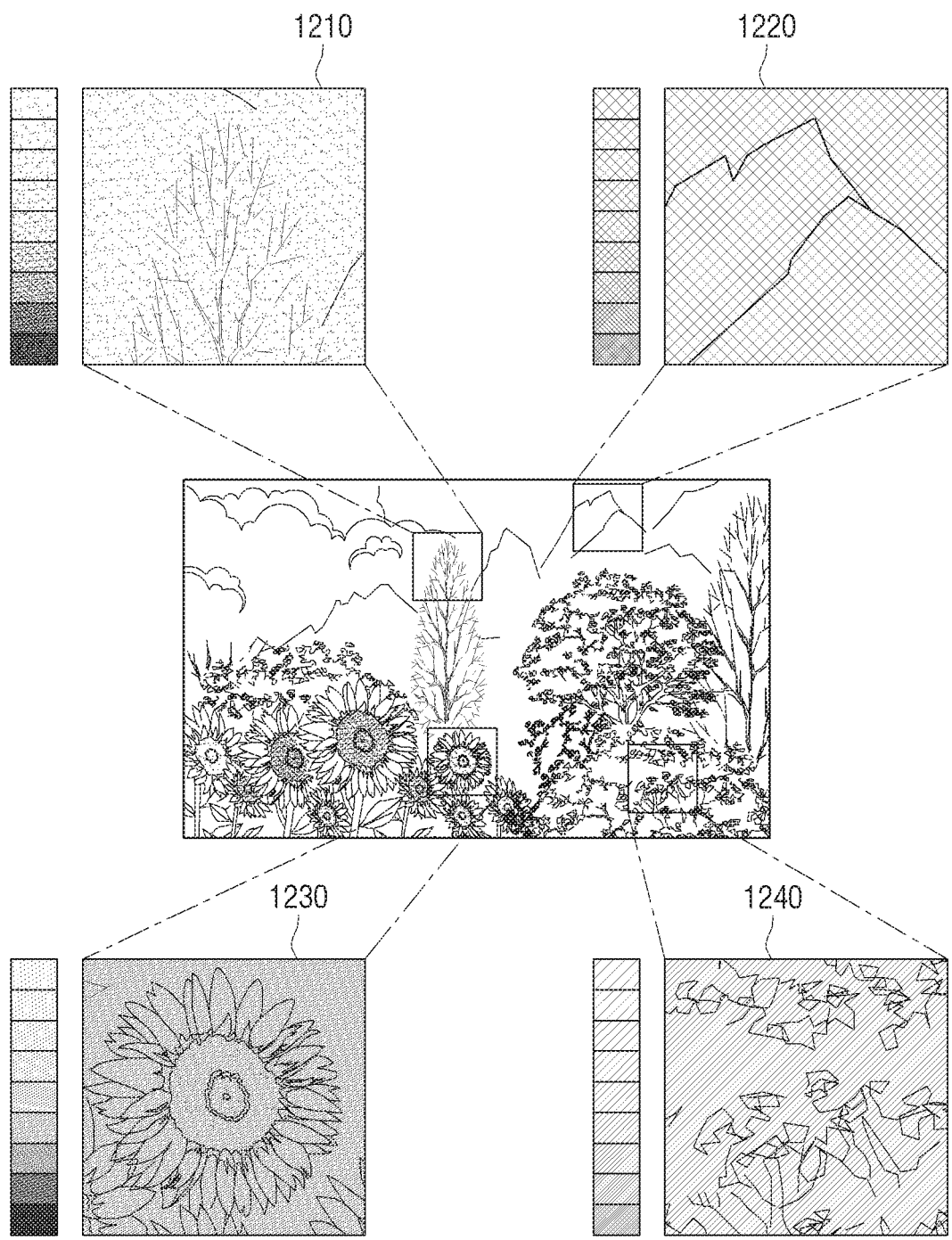
FIG. 12A and FIG. 12B are views to explain an image processing method according to an embodiment of the disclosure.
Figure 12B:
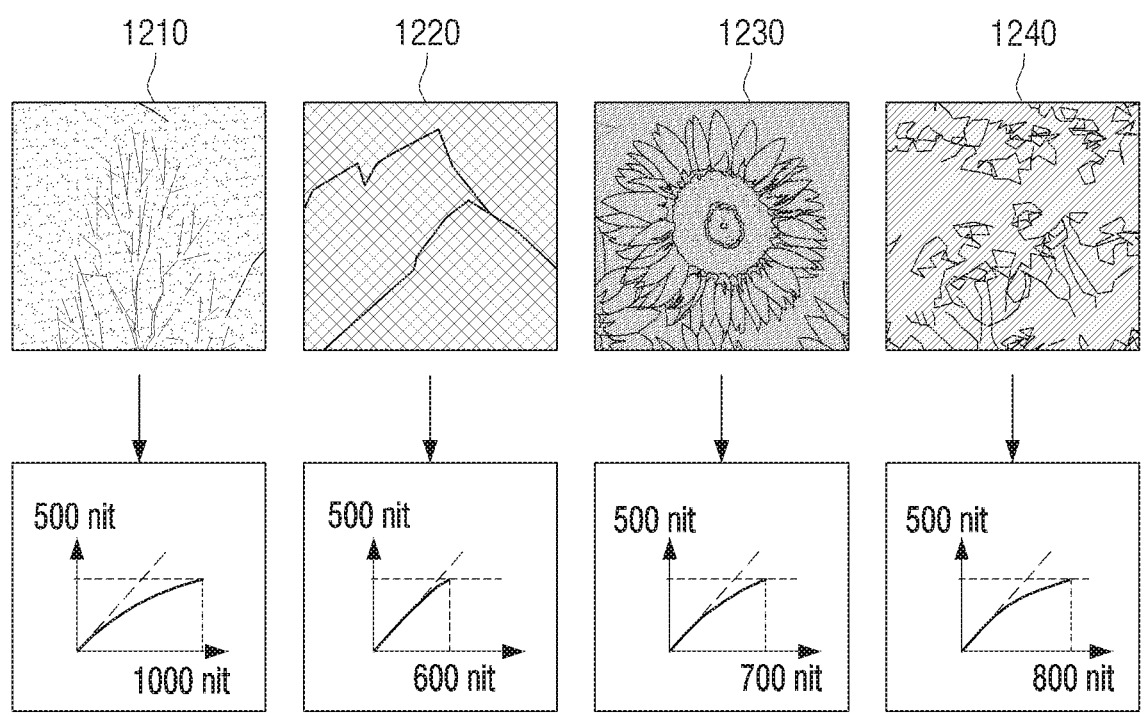

FIG. 12A and FIG. 12B are views to explain an image processing method according to an embodiment of the disclosure.

According to the above-described embodiment, the processor 120 may identify a seed region based on color information (e.g., an average pixel value, a maximum pixel value, and a minimum pixel value), and when region expansion is performed, each object region having a different color may be detected. For example, referring to FIG. 12, in the instance of an image having different type of objects such as a blue sky object 1210, a green tree object 1220, an object having different colors or different shades of a color such as a yellow flower object 1230 and a pink flower object 1240 having portions thereof of a same type and/or color may be detected as separate objects.

In this case, the processor 120 may perform divided object based image processing (or image quality processing).

For example, the processor 120 may individually adjust a contrast (contrast ratio) of each identified object 1210-1240 by analyzing the color of each object 1210-1240. For example, the processor 120 may individually adjust a contrast of the objects 1210-1240 by generating a contrast curve (or gamma curve) for each object 1210-1240, or adjust a contrast based on a database storing contrast information relating colors and contrasts. Accordingly, by way of darkening a bright portion, and darkening a dark portion for each object of a different color, color and brightness in a broader range may be expressed. When two or more objects 1210-1240 having a same or similar color are present, the processor 120 may adjust contrast of the objects having the same color using, for example, a same contrast curve or same information extracted from a database for adjusting contrast of objects having a particular color.

In addition, the processor 120 may adjust a contrast for each object 1210-1240 based on a High Dynamic Range (HDR) function. The HDR function may be a function that performs tone mapping on contents based on metadata provided together with contents to display the optimized contents. The tone mapping may be a method for expressing an original tone of contents in line with a dynamic range of the display 140 based on received metadata. The metadata may include at least one of color space information of contents, bit number information of contents, peak luminance information of contents, tone mapping information of contents, and mastering monitor information (e.g., maximum brightness information).

For example, the processor 120 may map a maximum luminance of the contents based on metadata to the luminance capability of the display 140, that is, the maximum luminance that can be expressed by the display 140. For example, referring to FIG. 12B, the processor 120 may process the contents of the image by applying a different tone mapping graph for each object 1210-1240 of a different color. However, the disclosure is not limited thereto. Various image processing may be individually performed on each object or objects of different colors, such as texture processing, noise reduction (NR) processing, etc. using a color-based object. In some cases, the processor 120 may use a dynamic tone mapping technique for providing an optimize color tone by optimizing a contrast according to a scene.

In addition, the processor 120 may perform image processing (or image quality processing) for each object of a different color by applying a deep-learning based AI technology. For example, the processor 120 may input images and object based detection information into the network model in which image processing is trained for each object of a different color, and obtain images image processed for each object.

For example, the processor 120 may obtain an image in which a contrast is adjusted for each object by inputting the image into the network model in which contrast (contrast ratio) adjustment is trained by each object, particularly, for each object of a different color. For another example, the processor 120 may obtain a texture processed image for each object of a different color by applying a network model in which the texture processing is trained for each object of a different color.

When the display 140 is embodied as an LCD panel using a back light, the processor 120 may perform contrast adjustment for each object suing a local dimming method. For example, the processor 120 may perform contrast adjustment by adjusting brightness for each backlight pixel block area based on a display area of each object.

However, the above-described embodiment explains that each object for image processing is distinguished based on color information, but the disclosure is not limited thereto. Each object for image processing may be identified further considering at least one of color information, brightness information, variation information, standard deviation information, edge information or texture information. For example, the textures of a flower object and a leaves object may be different even if they both have a same (e.g., orange) color. Therefore, a different image processing may be performed for object of a same or similar color.

Figure 13:
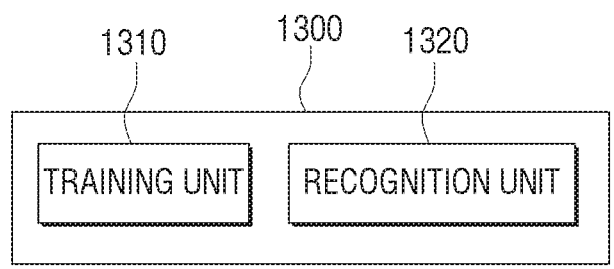
FIG. 13 is a view to explain a detailed configuration of a training network model according to an embodiment of the disclosure.

Referring to FIG. 13, a training network model 1000 according to an embodiment may include a training unit 1310, a recognition unit 1320.

According to an embodiment, the processor 120 may detect a seed region of each frame using the training network model 1000. In some cases, it is possible to perform a region growing processing using the training network model 1300.

The training unit 1310 may generate or train a recognition model having a reference for detecting a seed region. The training unit 1310 may generate a recognition model having a determination reference using the collected training data. For example, the training unit 1310 may generate, train, or renew an object recognition model having a reference for determining an object included in an image by using an image including an object as training data. For another example, the training unit 1310 may generate, train, or renew a peripheral information recognition model having a reference for determining various additional information in the vicinity of an object included in an image by using peripheral information included in an image including an object as training data.

The recognition unit 1320 may estimate an object to be recognize included in predetermined data using the predetermined data as input data of the trained recognition model. For example, the recognition unit 1320 may use an object region (or image) including an object as input data of the trained recognition model and obtain (or estimate, infer) object information on an object included in an object region, for example, a seed region.

At least part of the training unit 1310 and at least part of the acquisition unit 1320 may be embodied as a software module and manufactured in the form of one or a plurality of hardware chips to be mounted on the electronic apparatus 100. For example, at least one of the training unit 1310 and the recognition unit 1320 may be manufactured in the form of a hardware chip for Artificial Intelligence (AI) only, or manufactured as a part of an existing general processor (e.g. a CPU or an application processor) or a graphic processor (e.g., a GPU) to be mounted on the electronic apparatuses in a variety of types. The hardware chip for Artificial Intelligence (AI) only may be a processor specialized for probability computation having a higher parallel processing performance than the conventional general processor, thereby quickly performing an arithmetic operation in the artificial intelligence field such as machine training. When the training unit 1310 and the acquisition unit 1320 are implemented as a software module (or a program module including an instruction), the software module may be a non-transitory computer readable media. In this case, the software module may be provided by an operating system (OS) or by a predetermined application. Alternatively, some of the software modules may be provided by an Operating System (OS), and some of the software modules may be provided by a predetermined application.

Figure 14:
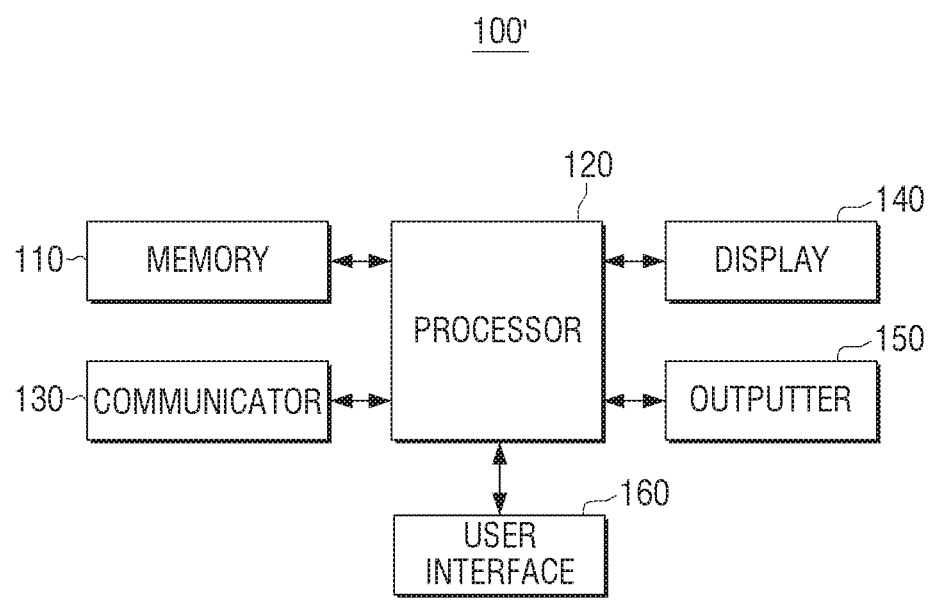
FIG. 14 is a view illustrating an example embodiment of an image processing apparatus according to an embodiment.

FIG. 14 is a view illustrating an example embodiment of an image processing apparatus according to an embodiment.

Referring to FIG. 14, an image processing apparatus 100' may include a memory 110, a processor 120, a communicator (or inputter) 130, a display 140 and a user interface 150. The redundant description of configurations of FIG. 2 will be omitted.

According to an embodiment, the memory 110 may be embodied as a single memory that stores data generated by various operations according to an embodiment.

However, according to another embodiment, the memory 110 may be configured to include the first to third memories.

The first memory may store at least part of images input through the communicator 130. The first memory may store at least part region of the input image frame. In this case, at least partial region may be a region necessary for performing image processing according to an embodiment. According to an embodiment, the first memory may be embodied as an N line memory. For example, the N line memory may be a memory having a capacity of 17 lines in a vertical direction, but the disclosure is not limited thereto. For example, when a Full HD image of 1080p (resolution of 1,920×1,080) is input, the image region of 17 lines in the Full HD image may be stored in the first memory. As such, the first memory may be embodied as the N line memory, and the reason why the partial region of the input image frame is stored for image processing is that the memory capacity of the first memory is limited due to the hardware limitations.

The second memory may be a memory for storing the obtained region detection information, and may be embodied as memories of various sizes according to various embodiments of the disclosure. For example, according to an embodiment, when region detection information corresponding to each pixel block of an input image is stored, the second memory may be embodied in an appropriate size to store the region detection information.

The third memory may be a memory for storing the image processed (e.g., texture improved processed) output image, and embodied as memories of various sizes according to various embodiments. For example, according to an embodiment, the third memory may be implemented with a size equal to or larger than the size of the input image when the output image is acquired and displayed by applying all the texture components corresponding to the pixel values of the input image. According to another embodiment, when an image is output in units of images corresponding to the size of the first memory, or in units of pixel lines, the image may be implemented in an appropriate size for storing the image. However, the third memory may not be necessary if the output image is overwritten in the first memory or the second memory, or the output image is displayed without being stored.

The communicator 130 may be a communication interface for receiving various types of contents. For example, the communicator 130 may receive image signals in a streaming method or a download method from an external device (e.g., a source device), an external storage medium (e.g., USB), an external server (e.g., web hard), or the like through communication methods such as AP-based Wi-Fi (Wi-Fi, wireless LAN network), Bluetooth, Zigbee, wired/wireless Local Region Network (LAN), WAN, Ethernet, IEEE 1394, High Definition Multimedia Interface (HDMI), Mobile High-Definition Link (MHL), Universal Serial Bus (USB), Display Port (DP), Thunderbolt, Video Graphics Array (VGA) port, RGB port, D-subminiature (D-SUB), Digital Visual Interface (DVI), or the like. The image signal may be a digital image signal (e.g., a digital video signal), but is not limited thereto.

The display 140 may be embodied as a display including a self-luminous element and a backlight including a non-luminous display. The display 140 may be implemented as various types of displays such as a Liquid Crystal Display (LCD), an Organic Light Emitting Diodes (OLED) display, a Light Emitting Diodes (LED), Micro LED, mini LED, a Plasma Display Panel (PDP), and the like. The display 140 may also include a driving circuit, a backlight unit, etc., which may be implemented in the form of an a-si TFT, a low temperature poly silicon (LTPS) TFT, an organic TFT (OTFT), etc. Meanwhile, the display 140 may be implemented as a touch screen in combination with a touch sensor, a flexible display, a three dimensional display (3D display), etc.

The display 140 may include not only a display panel for outputting an image, but also a bezel for housing a display panel. Particularly, according to an embodiment, a bezel may include a touch sensor (not shown) for sensing user interaction.

The processor 120 may control the display 140 to display images processed according to various embodiments.

The processor 120 may perform a graphic processing function (a video processing function). For example, the processor 120 may generate a screen including various objects such as icons, images, texts, etc. by using a calculation unit (not shown) and a rendering unit (not shown). The calculation unit (not shown) may calculate attribute values such as coordinate values, shapes, sizes, colors, etc. of the objects according to the layout of the screen by using the received control command. The rendering unit (not shown) may generate screens of various layouts including objects based on the attribute values calculated by the calculation unit (not shown). According to an embodiment, the operation may be performed by a main CPU and a separately equipped GPU (not shown). The processor 120 may perform various image processing such as decoding, scaling, noise filtering, frame rate conversion, resolution conversion, etc. on video data.

According to another embodiment, the processor 120 may perform processing on audio data. The processor 120 may perform various processing such as decoding, amplification, noise filtering, etc. on audio data.

The outputter 150 may output sound signals. For example, the outputter 150 may convert, amplify, and output digital sound signal processed by the processor 140 into analog voice signals. For example, the outputter 150 may include at least one speaker unit, D/A converter, audio amplifier, etc. that outputs at least one channel. For example, the outputter 150 may include an L channel speaker, and an R channel speaker that reproduces an L channel, and an R channel, respectively. However, the disclosure is not limited thereto. The outputter 150 may be embodied in various forms. For another example, the outputter 150 may be embodied in the form of a sound bar that reproduces L channel, R channel, and Center channel.

The user interface 160 may be embodied as a button, a touch pad, a mouse, and a keyboard, or embodied as a touch screen, a remote control receiving unit that is capable of performing the display function and the operation input function described above. The button may include various types of input means such as a mechanical button, a touch pad, a whirl, etc. formed in an area such as a front part, a side par, a rear part, etc. of the outside of the body of the image processing apparatus 100'.

The image processing apparatus 100' may further include a tuner and a demodulator according to an embodiment. The tuner (not shown) may further include a radio frequency (RF) broadcast signal received through an antenna. The remote control transmitting and receiving unit (not shown) can receive the RF broadcasting signal by tuning the infrared communication, the channel selected by the Bluetooth communication user, or all the pre-stored channels. A demodulator (not shown) may receive and demodulate the digital IF signal DIF converted by the tuner, and perform channel decoding. In addition, the image processing apparatus 100 may receive a remote control signal from an external remote control device or transmit a remote control signal through at least one of a remote control receiving unit (not shown, or Wi-Fi communication) according to an embodiment.

Figure 15:
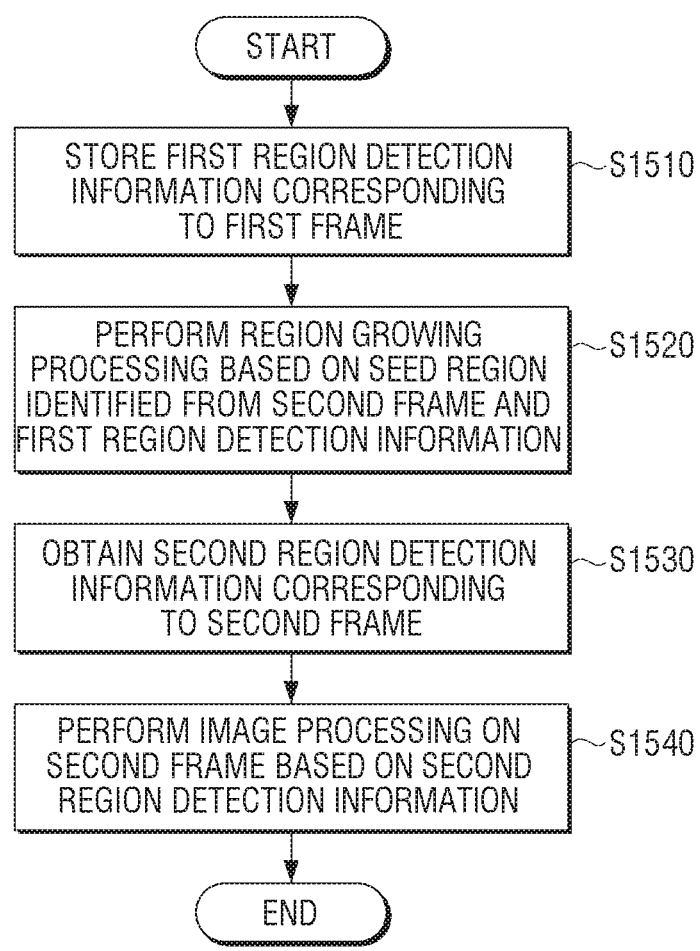
FIG. 15 is a flowchart to explain an image processing method according to an embodiment of the disclosure.

FIG. 15 is a flowchart to explain an image processing method according to an embodiment of the disclosure.

According to an image processing method of FIG. 15, an image processing apparatus may store first region detection information corresponding to the first frame at step S1510.

The image processing apparatus may perform a region growing processing based on the seed region identified from the second frame and the first region detection information at step S1520, and obtain the second region detection information corresponding to the second frame at step S1530. The second frame, for example, may be a frame immediately after the first frame in the video contents, or a next frame following the frame.

The image processing apparatus may perform image processing on the second frame based on the obtained second region detection information at step S1540.

The obtaining of the second region detection information at steps S1520 and S1530 may include identifying a first adjacent pixel region that is adjacent to the identified seed region, and a second adjacent pixel region that is adjacent to the first pixel region corresponding to the first region detection information, performing a region growing processing on a seed region based on the similarity between the seed region and the first adjacent pixel region, and performing a region growing processing on the first pixel region based on the similarity between the first pixel region and the second adjacent pixel region.

The obtaining of the second region detection information at steps S1520 and S1530 may include adding a third pixel region having the similarity between a seed region and the first adjacent pixel region of a threshold value of more to a detection region, adding a fourth pixel region having the similarity between a third adjacent pixel region that is adjacent to a third pixel region and the third pixel region of a threshold value of more to a detection region, adding a fifth pixel region having the similarity between the first pixel region and the second adjacent pixel region of a threshold value of more to a detection region, and adding a pixel region having the similarity between a sixth adjacent pixel region that is adjacent to the fifth pixel region and the fifth pixel region having a threshold value of more to a detection region.

In addition, the obtaining of the second region detection information at step S1520 and S1530 may include identifying the second frame as a plurality of pixel blocks, identifying whether each of the pixel blocks in the first line among the plurality of pixel blocks is a seed region, identifying whether the pixel block is an adjacent pixel block of a seed region or an adjacent pixel block of the first pixel region, performing region detection for each of the pixel blocks, and performing region detection on each of the pixel blocks in the second line after region detection on the first line is completed.

In addition, the obtaining of the second region detection information at step S1520 and S1530 may include performing region detection on pixel blocks in the first line in the first direction sequentially, and perform region detection on pixel blocks in the second line in the second direction different from the first direction sequentially.

The first region detection information may include first identification information indicating whether each of the plurality of pixel blocks included in the first frame is a detection region, and the second region detection information may include second identification information indicating whether each of the plurality of pixel blocks included in the second frame is a detection region. In this case, the obtaining of the second region detection information at step S1520 and S1530 may include obtaining the second identification information based on the first identification information and the second seed region.

The first region detection information may include first probability information in which each of a plurality of pixel blocks included in the first frame is included in a detection region, and the second region detection information may include second probability information in which each of the plurality of pixel blocks included in the second frame is included in the detection region. The obtaining of the second region detection information at steps S1520 and S1530 may include obtaining second probability information based on the first probability information and the second seed region.

According to an embodiment, the second region detection information may include a region detection result of the second frame for a pixel block to be processed before a present pixel block included in the second frame, and a region detection result of the first frame for a pixel block to be processed.

When the first region detection information is obtained, the image processing apparatus 100 may perform image processing on the first frame based on the first region detection information, and store the first region detection information. The image processing apparatus 100 may perform image processing on the second frame based on the obtained second region detection information, and store the second region detection information.

Also, the image processing apparatus may sequentially display the first and second frames that have been d-image-processed based on the first and second region detection information, respectively. The first and second frames may be a 4K Ultra High Definition (UHD) image or an 8K UHD image frame.

According to the various embodiments described above, accurate region detection results may be obtained with a small number of operations (e.g., one iteration). That is, even if the seed region differs from frame to frame, a consistent detection result may be obtained. Also, memory usage may be reduced due to fewer operations.

Meanwhile, according to an embodiment of the disclosure, as described in FIGS. 3A and 3B, 4A and 4B, and 5A and 5B, the detection region may gradually grow in each frame sequentially. Accordingly, the region where the same image processing is performed in each output frame may gradually grow. For example, if, a region subjected to image processing (e.g., texture processing) in a present output frame grows compared to an image processed region in a previously output frame, and a region subjected to the image processing in the same manner in a following output frame grows compared to a present output frame. It may be determined that it infringes the embodiment of the disclosure. The growing means that the image-processed region in the currently output frame includes the image-processed region in the previously output frame, and additionally includes another region.

Various embodiments of the disclosure could be applied to an image receiving apparatus such as a set-top box, a display device such as a TV, and all image processing devices capable of image processing such as a server, etc. as well as an image processing device.

The methods according to various embodiments may be embodied as applications that could be mounted in a previous image processing apparatus.

Further, the methods according to various embodiments of the disclosure described above may be implemented by a software upgrade, or a hardware upgrade, for an existing image processing apparatus.

Various embodiments of the disclosure may be performed by at least one of an embedded server provided in an image processing apparatus, or an external server of an image processing apparatus or a display device.

According to an embodiment of the disclosure, various embodiments described above may be embodied as the form of software, including instructions stored on machine-readable storage media readable by a machine (e.g., a computer). The machine may be an apparatus that calls a command stored in a storage medium and is operable according to the called command, including an electronic apparatus in accordance with the disclosed example embodiments (e.g., an electronic apparatus). When the command is executed by a processor, the processor may perform the function corresponding to the command, either directly or under the control of the processor, using other components. The command may include code generated or executed by a compiler or an interpreter. The machine-readable storage medium may be provided in the form of a non-transitory storage medium. The 'non-temporary' means that the storage medium does not include a signal but is tangible, but does not distinguish whether data is stored semi-permanently or temporarily on a storage medium.

According to an embodiment, the method according to various embodiments disclosed herein may be provided in a computer program product. A computer program product may be traded between a seller and a purchaser as a commodity. A computer program product may be distributed in the form of a machine-readable storage medium (e.g., compact disc read only memory (CD-ROM)) or distributed online through an application store (e.g., PlayStore™). In the case of on-line distribution, at least a portion of the computer program product may be temporarily stored, or temporarily created, on a storage medium such as a manufacturer's server, a server of an application store, or a memory of a relay server.

Each of the components (e.g., modules or programs) according to various embodiments may consist of a single entity or a plurality of entities, and some subcomponents of the abovementioned subcomponents may be omitted, or other components may be further included in various embodiments. Alternatively or additionally, some components (e.g., modules or programs) may be integrated into one entity to perform the same or similar functions performed by each component prior to integration. Operations performed by modules, programs, or other components, in accordance with various embodiments, may be executed sequentially, in parallel, repetitively, or heuristically, or at least some operations may be performed in a different order, or omitted, or another function may be further added.

Although embodiments have been shown and described, it will be appreciated by those skilled in the art that changes may be made to these embodiments without departing from the principles and spirit of the disclosure. Accordingly, the scope of the invention is not construed as being limited to the described embodiments, but is defined by the appended claims as well as equivalents thereto.

What is claimed is:

1. An image processing apparatus, comprising:
a memory configured to store first region detection information corresponding to at least one object of a first frame; and
a processor configured to:
perform region growing processing based on a seed region identified from a second frame and a first pixel region corresponding to the first region detection information,
obtain second region detection information corresponding to at least one object of the second frame, based on the region growing processing, and
perform image processing on the second frame based on the second region detection information,
wherein the processor is further configured to perform region growing processing on the first pixel region based on a second adjacent pixel region adjacent to the first pixel region.

2. The image processing apparatus as claimed in claim 1, wherein the processor is further configured to:
identify the second adjacent pixel region and a first adjacent pixel region that is adjacent to the seed region,
perform region growing processing on the seed region based on a similarity between the seed region and the first adjacent pixel region, and
perform the region growing processing on the first pixel region based on a similarity between the first pixel region and the second adjacent pixel region.

3. The image processing apparatus as claimed in claim 2, wherein the processor is further configured to:
add a third pixel region in which the similarity between the seed region and the first adjacent pixel region is a threshold value or more to a detection region,
add a fourth pixel region in which the similarity between a third adjacent pixel region that is adjacent to the third pixel region and the third pixel region is a threshold value or more to the detection region,
add a fifth pixel region in which the similarity between the first pixel region and the second adjacent pixel region is a threshold value or more to the detection region, and
add a pixel region in which a similarity between a sixth adjacent pixel region that is adjacent to the fifth pixel region and the fifth pixel region is a threshold value or more to the detection region.

4. The image processing apparatus as claimed in claim 2, wherein the processor is further configured to:
identify the second frame as a plurality of pixel blocks,
identify whether each of pixel blocks in a first line among the plurality of pixel blocks corresponds to the seed region,
identify whether each of the pixel blocks is an adjacent pixel block of the seed region or an adjacent pixel block of the first pixel region to perform region detection, and
perform region detection on each of pixel blocks in a second line after region detection on the first line is completed.

5. The image processing apparatus as claimed in claim 4, wherein the processor is further configured to:
perform region detection on the pixel blocks in the first line sequentially in a first direction, and
perform region detection on the pixel blocks in the second line sequentially in a second direction different from the first direction.

6. The image processing apparatus as claimed in claim 1, wherein the first region detection information includes first probability information in which each of a plurality of pixel blocks in the first frame is included in a detection region,
  wherein the second region detection information includes second probability information in which each of a plurality of pixel blocks in the second frame is included in the detection region, and
  wherein the processor is further configured to obtain the second probability information based on the first probability information and the seed region.

7. The image processing apparatus as claimed in claim 1, wherein the first region detection information includes first identification information indicating whether each of a plurality of pixel blocks in the first frame is a detection region,
  wherein the second region detection information includes second identification information indicating whether each of a plurality of pixel blocks in the second frame is the detection region, and
  wherein the processor is further configured to obtain the second identification information based on the first identification information and the seed region.

8. The image processing apparatus as claimed in claim 1, wherein the processor is further configured to identify the second frame as a plurality of pixel blocks, and sequentially perform region detection on the plurality of pixel blocks, and
  wherein the second region detection information includes a region detection result of the second frame with respect to a previously processed pixel block based on a present pixel block included in the second frame, and a region detection result of the first frame with respect to a pixel block to be processed.

9. The image processing apparatus as claimed in claim 1, wherein the processor is further configured to:
  based on obtaining the first region detection information, perform image processing on the first frame based on the first region detection information, and store the first region detection information in the memory, and
  perform image processing on the second frame based on the second region detection information and store the second region detection information in the memory.

10. The image processing apparatus as claimed in claim 1, wherein the second region detection information is obtained by updating the first region detection information stored in the memory based on a region detection result of the second frame.

11. The image processing apparatus as claimed in claim 1, further comprising:
  a display,
  wherein the processor is further configured to control the display to sequentially display the first frame and the second frame on which image processing is performed,
  wherein the first frame on which image processing is performed includes an image-processed first region,
  wherein the second frame on which image processing is performed includes an image-processed second region, and
  wherein the image-processed second region includes the image-processed first region and a third region other than the image-processed first region.

12. The image processing apparatus as claimed in claim 1, wherein the first frame and the second frame are 4K Ultra High Definition (UHD) images or 8K UHD image frames.

13. The image processing apparatus as claimed in claim 1, wherein the processor is further configured to:
  perform region expansion based on each seed region identified based on different color information, and
  perform image processing for each object region of a different color included in the second region detection information.

14. The image processing apparatus as claimed in claim 13, wherein the processor is further configured to obtain an output image that is image processed by applying the second frame and the second region detection information into a training network model, and
  wherein the training network model is a model trained to apply an image processing for each object region of a different color.

15. The image processing apparatus as claimed in claim 14, wherein the training network model is a model trained to perform contrast adjustment for each object region of a different color.

16. An image processing method for an image processing apparatus, the image processing method comprising:
  storing first region detection information corresponding to at least one object of a first frame;
  performing region growing processing based on a seed region identified from a second frame and a first pixel region corresponding to the first region detection information,
  obtaining second region detection information corresponding to at least one object of the second frame, based on performing the region growing processing; and
  performing image processing on the second frame based on the second region detection information,
  wherein the image processing method further comprises performing region growing processing on the first pixel region based on a second adjacent pixel region adjacent to the first pixel region.

17. The image processing method as claimed in claim 16, wherein the obtaining of the second region detection information comprises:
  identifying the second adjacent pixel region and a first adjacent pixel region that is adjacent to the seed region,
  performing region growing processing on the seed region based on a similarity between the seed region and the first adjacent pixel region, and
  performing the region growing processing on the first pixel region based on a similarity between the first pixel region and the second adjacent pixel region.

18. The image processing method as claimed in claim 17, wherein the obtaining of the second region detection information comprises:
  adding a third pixel region in which a similarity between the seed region and the first adjacent pixel region is a threshold value or more to a detection region,
  adding a fourth pixel region in which a similarity between a third adjacent pixel region that is adjacent to the third pixel region and the third pixel region is a threshold value or more to the detection region,
  adding a fifth pixel region in which a similarity between the first pixel region and the second adjacent pixel region is a threshold value or more to the detection region, and
  adding a pixel region in which a similarity between a sixth adjacent pixel region that is adjacent to the fifth pixel region and the fifth pixel region is a threshold value or more to the detection region.

19. The image processing method as claimed in claim 17, wherein the obtaining of the second region detection information comprises:
   identifying the second frame as a plurality of pixel blocks,
   identifying whether each of pixel blocks in a first line among the plurality of pixel blocks corresponds to the seed region,
   identifying whether each of the pixel blocks is an adjacent pixel block of the seed region or an adjacent pixel block of the first pixel region to perform region detection, and
   performing region detection on each of pixel blocks in a second line after region detection on the first line is completed.

20. A non-transitory computer readable recording medium having stored thereon a computer command which, when executed by a processor of an image processing apparatus, causes the image processing apparatus to perform operations including:
   storing first region detection information corresponding to at least one object of a first frame;
   performing region growing processing based on a seed region identified from a second frame and a first pixel region corresponding to the first region detection information;
   obtaining second region detection information corresponding to at least one object of the second frame, based on performing the region growing processing; and
   performing image processing on the second frame based on the obtained second region detection information,
   wherein the operations further include performing region growing processing on the first pixel region based on a second adjacent pixel region adjacent to the first pixel region.

* * * * *